(12) United States Patent
Buiting et al.

(10) Patent No.: US 9,792,258 B2
(45) Date of Patent: Oct. 17, 2017

(54) METHODS FOR DETERMINING WELL CHARACTERISTICS AND PORE ARCHITECTURE UTILIZING CONVENTIONAL WELL LOGS

(71) Applicant: Saudi Arabian Oil Company, Dhahran (SA)

(72) Inventors: Johannes Jacobus Buiting, Dhahran (SA); Nicolas Leseur, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1134 days.

(21) Appl. No.: 13/657,379

(22) Filed: Oct. 22, 2012

(65) Prior Publication Data

US 2013/0103319 A1    Apr. 25, 2013

Related U.S. Application Data

(60) Provisional application No. 61/550,209, filed on Oct. 21, 2011.

(51) Int. Cl.
| | |
|---|---|
| *G06F 17/18* | (2006.01) |
| *G01V 3/38* | (2006.01) |
| *G01V 11/00* | (2006.01) |
| *E21B 49/08* | (2006.01) |
| *E21B 49/00* | (2006.01) |

(52) U.S. Cl.
CPC .............. *G06F 17/18* (2013.01); *E21B 49/00* (2013.01); *E21B 49/087* (2013.01); *G01V 3/38* (2013.01); *G01V 11/00* (2013.01)

(58) Field of Classification Search
CPC ...................................................... G01V 3/38
See application file for complete search history.

(56) References Cited

U.S. PATENT DOCUMENTS

| | | |
|---|---|---|
| 4,435,977 A | 3/1984 | Gournay |
| 4,506,548 A | 3/1985 | Zemanek, Jr. |
| | (Continued) | |

OTHER PUBLICATIONS

J. Buiting, "Application of a New Method for Calculating Saturation Height Functions of Monomodal Pore Systems to," May 2011.
(Continued)

*Primary Examiner* — Manuel Rivera Vargas
(74) *Attorney, Agent, or Firm* — Brace LLP; Constance G. Rhebergen; Christopher L. Drymalla

(57) ABSTRACT

Provided are methods, computer readable medium, apparatus, and program code for determining well characteristics and pore architecture for a hydrocarbon well utilizing data available from conventional/standard electronic well logs. An example of a method can include determining the value of well constants from well log data to include calculating water saturation, free water level location, wettability, and pore throat heterogeneity, and calculating pore architecture at log resolution responsive thereto. This can be accomplished, for example, by accessing well log data from a conventional well log, determining a linear regression line responsive to parameters calculated from the well log data, the linear regression line having a slope and an intercept, and determining a value of each of a plurality of well constants responsive to a value of the slope and of the intercept of the linear regression line.

24 Claims, 17 Drawing Sheets

(56) References Cited

U.S. PATENT DOCUMENTS

| | | | |
|---|---|---|---|
| 4,752,882 | A | 6/1988 | Givens |
| 4,903,207 | A | 2/1990 | Alger et al. |
| 5,621,169 | A | 4/1997 | Harris et al. |
| 5,835,883 | A | 11/1998 | Neff et al. |
| 6,484,102 | B1 | 11/2002 | Holmes |
| 7,255,166 | B1 | 8/2007 | Weiss |
| 7,424,367 | B2 | 9/2008 | Saltzer et al. |
| 2002/0133323 | A1 | 9/2002 | Dahlberg |
| 2006/0287201 | A1 | 12/2006 | Georgi |
| 2007/0016389 | A1* | 1/2007 | Ozgen .................... E21B 49/00 703/10 |
| 2007/0203681 | A1 | 8/2007 | Eyvazzadeh et al. |
| 2009/0110242 | A1 | 4/2009 | Touati et al. |
| 2010/0211536 | A1 | 8/2010 | Al-Fattah |
| 2010/0300682 | A1 | 12/2010 | Thakur et al. |
| 2011/0208431 | A1 | 8/2011 | Skelt |
| 2012/0130639 | A1 | 5/2012 | Hanson |

OTHER PUBLICATIONS

J. Buiting, "A New Method for Calculating Saturation Height Functions of Monomodal Pore Systems," Apr. 2011.
W. Abdallah, "Fundamentals of Wettability," Oilfield Review, 2007.
Phillips, Full Pore System Petrophysical Characterization Technology for Complex Carbonate Reservoirs—Results from Saudi Arabia.
B. Harrison, "Saturation Heights Methods and Their Impact on Volumetric Hydrocarbon in Place Estimates," SPE 71326, 2001.
S. Biniwale, "An Integrated Method for Modeling Fluid Saturation Profiles and Characterising Geological Environments using a Modified FZI Approach: Australian Fields Case Study," SPE-099285-STU, 2005.
N. Wiltgen, "Methods of Saturation Modeling Using Capillary Pressure Averaging and Pseudos," SPWLA 44th Logging Symposium, Jun. 22-25, 2003.
A. Johnson, "Permeability Averaged Capillary Data: A Supplement to Log Analysis in Field Studies," SPWLA Twenty-Eighth Annual Logging Symposium, Jun. 29-Jul. 2, 1987.
E. Pittman, "Relationship of Porosity and Permeability to Various Parameters Derived From Mercury Injection-Capillary Pressure Curves for Sandstone," The American Association of Petroleum Geologists Bulletin, V. 76,No. 2 (Feb. 1992), p. 191-198.
W.R. Aufricht, "The Interpretation of Capillary Pressure Data From Carbonate Reservoirs," SPE-826-G, Oct. 1957.
E. Sondena, "An Empirical Method for Evaluation of Capillary Pressure Data," Elf Petroleum Norge A/S, date unknown.
Chapter 3: Hydrostatic Fluid Distribution, Rice University, found at www.owlnet.rice/edu/ceng671/Chap3pdf, date unknown.
PCT International Search Report and Written Opinion, dated Apr. 22, 2013; International Application No. PCT/US2012/061013; International Filing Date: Oct. 19, 2012 (19 pages).
Clerke, E.A., et al., "Application of Thomeer Hyperbolas to decode the pore systems, facies and reservoir properties of the Upper Jurassic Arab D Limestone, Ghawar filed, Saudi Arabia: A "Rosetta Stone" approach", Geoarabia, Gulf Petrolink, BH, vol. 13, No. 4, Jan. 1, 2008, pp. 113-160.
Thomeer, J. H., "Air Permeability as a Function of Three Pore-Network Parameters", Journal of Petroleum Technology, AIME, Dallas, Texas, US, vol. 35, Apr. 1, 1983, pp. 809-814.

* cited by examiner

METHODS FOR DETERMINING WELL CHARACTERISTICS AND PORE ARCHITECTURE UTILIZING CONVENTIONAL WELL LOGS

RELATED APPLICATIONS

This application is a non-provisional of and claims priority to and the benefit of U.S. Provisional Application No. 61/550,209, filed on Oct. 21, 2011, and is related to U.S. patent application Ser. No. 13/657,408, filed on Oct. 22, 2012, titled "Apparatus and Computer Readable Medium for Determining Well Characteristics and Pore Architecture Utilizing Conventional Well Log," incorporated herein by reference in its entirety.

BACKGROUND OF THE INVENTION

1. Field of the Invention

This invention relates in general to hydrocarbon production, and more particularly to methods, computer readable medium, apparatus, and program code, for determining well characteristics and pore architecture for a hydrocarbon well.

2. Description of the Related Art

Water saturation can be a crucial property of oil reservoirs. It is not a parameter that is simple to predict, however. Industry standard practices use empirical functions which are linked to hard data and measurements through regression techniques which lead to pure statistical and meaningless parameters from a physics point of view. Of the numerous methods that have been developed over the years to predict/estimate water saturation, a capillary pressure-based method which employs the Leverett J-function is the most popular. The Leverett J-function is a dimensionless function of water saturation describing the capillary pressure within a reservoir, which uses the physical properties of rock as input terms. Other examples of methods which provide water saturation predictions include a capillary pressure-based method by Johnson (1987), a log-based method by Cuddy (1993), and a capillary pressure and log-based method by Skelt-Harrison and Skelt (1995), The prior methods of predicting water saturation have two main pitfalls. First, they are mostly empirical and based on mathematical correlations. Hence, they are strictly valid only for specific conditions, formations, and/or environment. Also, the actual domain of applicability is defacto unknown. Second, the lack of relations to meaningful physical quantities and physics principles make the interpretation and validation heuristic. That is, prior methods fail to use or prove a link between the results and actual measurable physical quantities.

SUMMARY OF THE INVENTION

Accordingly, recognized by the Applicant is the need for methods, computer readable medium, apparatus, and program code for estimating/predicting well characteristics including water saturation which is not primarily empirical in nature and which relates to meaningful physical quantities and physics principles to provide a better understanding of the results and enhanced validation.

In view of the foregoing, various embodiments of the present invention provide methods (including computer implemented/assisted methods), computer readable medium, apparatus, and program code for estimating/predicting well characteristics including water saturation which is not primarily empirical in nature. According to various embodiments of the present invention, the methods, computer readable medium apparatus, and program code provide results which relate to meaningful physical quantities and physics principles to provide a better understanding of the results and enhanced validation. Where prior methods fail to use or prove a link between their observations/methods and physical quantities, various embodiments of the present invention advantageously use physics principles and data interpretation. Physical principles can be seen as major input data that other techniques have been trying to compensate for by gathering more experimental data.

Various embodiments of the present invention employ techniques which integrate such physics principles and actual measurements to provide a robust foundation for data quality control and to minimize the use of empirical relationships. According to various embodiments of the present invention, all fitting parameters involved in water saturation estimation are physical quantities, which can be measured in a laboratory. There are no saturation height functions known to Applicant which strictly involve physical quantities as their fitting parameters.

Various embodiments the present invention employ strong and explicit physical concepts like the equilibrium between buoyancy and capillary pressure, a Pore Architecture Model (from Thomeer, 1960), and the Buiting-Clerke Permeability concept (2007), which has not been achieved by prior methods.

Various embodiments of the present invention provide methods, computer readable medium, apparatus, and program code for determining not only estimated water saturation, but also wettability and pore architecture for a hydrocarbon well utilizing data available from conventional/standard well logs. The current state-of-the-art, in contrast, uses either special laboratory or downhole apparatus or existing advanced logging such as nuclear magnetic resonance (NMR) spectroscopy. Various embodiments of the present invention include methods, computer readable medium, apparatus, and program code which also enable continuous measurement of pore architecture parameters in a relatively short amount of time using existing log data and enable quality control of the electronic log input data.

An example of an embodiment of a method of determining well characteristics such as, for example, water saturation-related conditions utilizing well log data includes the step of accessing well log data from a conventional well log for a well. The well log data generally includes permeability predictions and porosity, and can include free water level height. The method also includes the steps of determining a linear regression line responsive to parameters calculated from the well log data, and determining a value of each of a plurality of well constants (e.g., free water level location, average wettability, and average pore throat heterogeneity) responsive to a value of the slope and of the intercept of the linear regression line.

According to an exemplary configuration, the step of determining a linear regression line comprises determining a best match linear regression line by adjusting the intercept and the slope of the linear regression line by minimizing an objective function to thereby identify the intercept and the slope that provides or is otherwise associated with the best match linear regression line. Alternatively, this step can include adjusting the intercept and the slope of the linear regression line and the free water level location by minimizing an objective function to thereby identify the intercept, the slope, and the free water level location that provides the best match linear regression line. The steps can also include calculating water saturation, wettability, and pore throat heterogeneity from the intercept and the slope of the best match linear regression line.

According to an exemplary configuration, the step of determining a value of each of the plurality of well constants can include determining an at least substantially most likely combination of values of the free water level location, the pore throat heterogeneity, and the wettability, and calculating the water saturation responsive to the respective slope and intercept rendering the pore throat heterogeneity and the wettability of the at least substantially most likely combination.

Further, the step of determining a linear regression line can include determining a best match linear regression line by minimizing an average sum of absolute differences between a location of each of a plurality of data points and each of a plurality of candidate best match linear regression lines, and the step of determining an at least substantially most likely combination of values of the free water level location, the pore throat heterogeneity, and the wettability includes identifying the slope and intercept of the best match linear regression line.

According to an alternative configuration, the step of determining an at least substantially most likely combination of values of the free water level location, the pore throat heterogeneity, and the wettability, can include employing a Monte Carlo simulation and an objective function to determine the most likely combination of the free water line location, the pore throat heterogeneity, and the wettability.

According to an exemplary configuration, the method can also include the step of validating a physical consistency of the water saturation, wettability, and pore throat heterogeneity. The validating step can include the steps of identifying one or more data points of a plurality of data points which do not fall within a linear trend, and when there exist one or more data points that do not fall within the linear trend, identifying one or more reasons respectively, and repairing the set of the plurality of data points. The step of repairing can be performed by correcting data associated with one or more data points which do not fall within the linear trend, porosity, permeability prediction, or water saturation exponent, and/or excluding one or more data points from the plurality of data points, to thereby avoid bias in the wettability, pore throat heterogeneity, and free water line characterization.

According to an exemplary configuration, the method can also include the steps of validating a physical consistency of the water saturation, wettability, and pore throat heterogeneity well constants, and calculating pore architecture parameters at log resolution responsive to the validated well constants, with the pore architecture parameters including pore throat heterogeneity, pore volume, and pore throat diameter.

Various embodiments of the present invention can also include non-transitory computer readable media containing program code/product including instructions that when executed by a computer cause the computer to perform operations which execute the computer implementable steps described above.

Various embodiments of the present invention also include apparatus which include a well characteristics and pore architecture analyzing computer including a processor and memory coupled to the processor, and well characteristics and pore architecture analyzing program product adapted to provide for determining various well parameters including water saturation, wettability, and pore architecture for a well through performance/execution of the computer implementable steps described above.

Various embodiments of the present invention beneficially provide a solution to problems faced in industry. For example, various embodiments of the present invention provide a robust, nonlinear formulation and optimization method, designed so that each term in the function can be explicitly and directly related to a physical measurable parameter. Various embodiments of the present invention provide a more robust and meaningful method to understand and predict water saturation, particularly in rocks with complex pore architecture like carbonates, and enable an inversion technique for determining wettability from conventional log response, at no additional cost. A fully quantitative wettability measurement, according to conventional methods, normally takes more than one year from start to completion and is performed with "dead oil." Various embodiments of the present invention employ techniques which provide in situ qualitative measurements available from log measurements (taken on a timescale of a few days maximum) at no extra cost beyond the costs usually involved with drilling and logging operations.

Various embodiments of the techniques partially compensate for the lack of Mercury Injection Capillary Pressure (MICP) measurements received through Mercury injection experiments (no longer required) and enable the derivation of pseudo-Thomeer parameters at log resolution (e.g., average pore heterogeneity, average wettability) from conventional logs, at no additional cost. Various embodiments also function to enable quality control of the log data against physics principles, and can provide a better understanding of the results with a higher reliability using the same number/amount of input data required according to industry standards. Fitting parameters can be related to physical measurable quantities, and therefore, quality control can be performed against real-world conditions rather than meaningless dimensionless parameters, which can be a key and necessary achievement in heterogeneous rock such as carbonates. Various embodiments of the technique also enable free water level inversion. Various embodiments of the present invention can be employed in the form of software developed for and/or imported into Geolog™ (available through Geocomp Corp., Acton Mass., http://www.geocomp.com/contact_us.asp), Techlog™ (available through Telsa, SA, France <http://www.techsia.com>), Interactive Petrophysics™ (Senergy, Banchory, UK, or other suitable software packages as understood by those skilled in the art, advantageously making such embodiments user-friendly.

Advantageously, from a pure water saturation prediction standpoint, the results according to various embodiments of the present invention are very satisfactory since they replicate very closely the resistivity based water saturation both in their variations and values. From a rock and fluid property perspective Pore Geometrical Factor (G) and wettability (W) values provided according to various embodiments of the present invention show substantial prediction reliability—e.g., the respective pore geometrical factor values were properly estimated within 1 standard deviation of that provided by the core data almost 80% of the time, and the wettability and FWL elevation fell within a reasonable range of meaningful and expected values. These results were also very consistent across the field.

Although mismatches and erroneous predictions existed, advantageously, a major strength of the application of the respective techniques was that they could always be explained. Water Saturation discrepancies and wrong G estimation could, in most tested scenarios, be attributed to 1) data inconsistency—e.g., permeability and Sw curves did not vary accordingly, 2) bimodality, and/or due to 3)

approximations made in the quadratic equation solution. It is important to note that in the last potential reason, the algorithm approximation issue has only been found to occur in reservoir rocks showing permeability below approximately 1 mD, which are very unlikely to economically produce oil. These are notable advantages as very few techniques currently enable the petrophysicist to explain both why it works, and when it does not, why it doesn't.

Another strong point about the respective techniques, according to various embodiments of the present invention, is that, even though they may strongly rely upon input data quality, they also enable quality control (QC), regardless of whether or not independently estimated/interpreted data such as, for example, permeability and water saturation (Sw), are coherent to each other. This fundamental strength finds its source in the fact that these techniques, according to various embodiments of the present invention, combine input data and physics principles. Without the latter, it would be effectively impossible to QC the input data quality and understand why and when the methodology behind the respective technique does not work. Not only do the various techniques enable. Wettability, FWL, and pore architecture prediction/estimation, they also lead to several indirect applications when integrated with other petrophysical and lithological data such as, for example, $V_{shale}$ inversion, lamination flagging, residual oil interval characterization, and pore system bimodality flagging.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
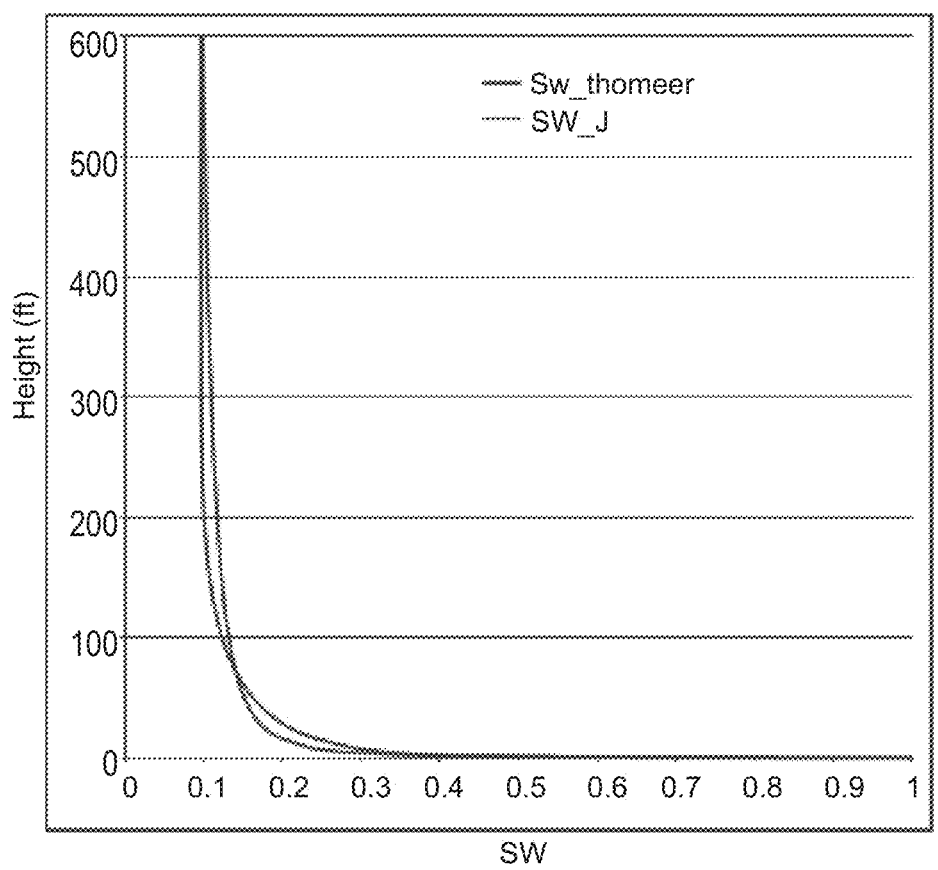
FIG. 1 is a graph illustrating a relationship between applied pressure and the amount mercury entering a pore system of a rock.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

A technology has been developed, based on Thomeer functions, which are conventionally used to analyze mercury injection experiments. These types of functions are suitable for complex multi-modal pore systems and can be upscaled to large geo-cells. In order to truthfully represent the complicated carbonate pore systems, however, these multimodal Thomeer functions are mathematically intricate and not straightforward to use. Accordingly, recognized was the desirability of a simpler algorithm for less complicated reservoir rocks, but one that would reflect the underlying physics of capillarity and buoyancy, which could be used in predicting water saturation, wettability, and pore architecture.

In the following portions of this description, techniques are introduced for mono-modal or near mono-modal pore systems, such as encountered in clastics and the simpler carbonates, along with techniques for extending the analysis to bimodal rock. These techniques relate loosely to Leverett's J-function approach, but provide a practical alternative that is much more physical—employing fitting parameters that can explicitly be expressed in terms of rock and fluid properties, such as wettability and pore architectural parameters. The techniques embodied in computer implemented/assisted methods, non-transitory computer readable medium, and apparatus, for example, can beneficially provide/execute four major steps: (1) the quantification of well constants/parameters including free water level elevation, average pore geometrical factor, and average wettability, described later, (2) probabilistic quantification of the quantified well constants to determine uncertainties (e.g., through Monte Carlo simulations), (3) the characterization of the pore architecture at log resolution using the quantified well constants, and (4) quality control of the input data applied to the characterization step. The quality control step can include a distribution and average comparison, blinded tests, and the analysis and explanation of major water saturation mismatches. Blind tests are particularly useful and have been employed when high-pressure mercury injection data is available.

The derivations explained immediately below provide the background for developing equations used to quantify the well constants. The derivations are generally based on the standard Thomeer functions. The derivations, however, include the embedding of a newly conceived Buiting-Clerke permeability (2008), which relates matrix permeability for a monomodal pore system to the corresponding Thomeer parameters. The result is a simple functional expression that allows the user to extract essential rock and fluid parameters from conventional log data and to estimate the actual water saturation in the wells to a high degree of precision. Moreover, when the freewater level is known, important parameters such as wettability, i.e. $\sigma \cos \theta$, can be readily extracted from the standard logs—a capability that is not yet available in the industry.

A. Mathematical Foundations

1. Mercury Injection Capillary Pressure Experiments and Thomeer Parameters.

Mercury injection capillary pressure experiments have been conducted on core samples to determine capillary pressures and pore size distributions. The experiments are based upon a relationship between the pressure of hydrogen injected in core samples.

In the 1960s, Thomeer found a simple relationship between applied pressure and the amount mercury entering a pore system of a rock. This is shown, for example, in FIG. 1 and by equation (1) as follows:

$$B_v(P_{Hg}) \approx B_v^\infty \exp\left(\frac{-g}{\ln(P_{Hg}) - \ln(P_d)}\right) \text{ for } P_{Hg} > P_d; 0 \text{ elsewhere,} \quad (1)$$

where $P_d$ is the minimum entry pressure, $P_{Hg}$ is the applied mercury pressure, g is the poro-elastic constant, $B_v$ is the fractional bulk volume occupied with mercury, and $B_v^\infty$ is the fractional bulk volume occupied with mercury at infinitely high pressures (i.e. where all of the pore space is filled). Note that for most pore systems, $\beta_v^\infty/\phi \approx 1.1$.

Equation (1) has proved to work for most rock systems and is a reflection of a common denominator between the pore architectures of naturally occurring reservoir rock.

The fractional bulk volume $B_v$ can be written in terms of porosity and mercury saturation, i.e., $B_v(P_{Hg})=S(P_{Hg})\phi$. As such, equation (1) can be rewritten in terms of a scaled mercury saturation as follows:

$$\tilde{S}(P_{Hg}) \approx \exp\left(\frac{-g}{\ln(P_{Hg}) - \ln(P_d)}\right) \text{ for } P_{Hg} > P_d; 0 \text{ elsewhere,} \quad (2)$$

-continued $$\text{wherein } \tilde{S}(P_{Hg}) = \frac{\phi}{B_v^\infty} S(P_{Hg}), \text{ and} \quad (3)$$

$$\text{wherein } \frac{\phi}{B_v^\infty} \leq 1 \Rightarrow 0 \leq \tilde{S} \leq S \leq 1.$$

2. Conversion from Hg-Air to Oil-Water Systems.

The above equation describing relationship between applied pressure and the amount of mercury entering a pore system of a rock, performed during mercury injection experiments, can be converted to an oil-water system by scaling the mercury pressures to capillary oil-water pressures using the effective interfacial tensions of mercury-air-rock and oil-water-rock. This is shown, by equation (4) as follows:

$$P_c = \frac{\sigma_{OW} \cos(\theta_{OW})}{\sigma_{HgA} \cos(\theta_{HgA})} P_{Hg} = \xi P_{Hg} \quad (4)$$

Here $\sigma_{HgA} \cos(\theta_{HgA})=367$ mN/m, and for water wet carbonate or clastic systems, $\sigma_{OW} \cos(\theta_{OW})$ is normally between 0 and 30 mN/m, i.e., $0<\xi<0.08$.

Converting equation (2) to the oil-water system using equation (4) yields oil saturation as a function of capillary pressure, or importantly, buoyancy pressure. This is shown by equation (5) as follows:

$$\tilde{S}(P_x) \approx \exp\left(\frac{-g}{\ln P_c - \ln \xi - P_d}\right) \text{ for } P_c > \xi P_d; 0 \text{ elsewhere.} \quad (5)$$

Equation (5) yields the following basic equation:

$$\frac{-g}{\ln \tilde{S}} \approx \ln P_c - \ln \xi - \ln P_d. \quad (6)$$

The oil's buoyancy (capillary) pressure in psi is $P_c=0.433*\Delta\rho*h$, with h in ft and $\Delta\rho$ in g/cc, and thus:

$$\frac{-g}{\ln \tilde{S}} \approx \ln(h) + \ln(0.433 \cdot \Delta\rho) - \ln \xi - \ln(P_d). \quad (7)$$

The parameter $\xi$ used to convert the capillary pressures from mercury-air to oil-water, is defined in equation (4) and is repeated here:

$$\xi = \frac{\sigma \cos(\theta)}{\sigma_{HgA} \cos(\theta_{HgA})}. \quad (8)$$

With this, equation (7) becomes:

$$\frac{-g}{\ln \tilde{S}} \approx \quad (9)$$

$$\ln(h) + \ln(\Delta\rho) - \ln(0.433) - \ln(\sigma \cos \theta) + \underbrace{\ln(\sigma_{HgA} \cos \theta_{HgA})}_{=367 \, mN/m} - \ln(P_d).$$

Simplifying, equation (9) yields the following equation for the oil-water system:

$$\frac{-g}{\ln \tilde{S}} \approx \ln(h) + \ln(\Delta\rho) - \ln(\sigma \cos\theta) + 5.1 - \ln(P_d). \quad (10)$$

A recently developed expression for permeability κ, i.e., the Buiting-Clerke permeability of well-connected for systems, is as follows:

$$\kappa \approx A \frac{B_v^\infty}{P_d^2} e^{-\beta\sqrt{g}}. \quad (11)$$

For many pore systems, such as good quality carbonates, A=506000 (md psi$^2$) and β=2.92. The minimum entry pressure $P_d$ can be expressed in the terms of equation (12) as follows:

$$P_d^2 \approx A' e^{-\beta\sqrt{g}} \frac{\phi}{\kappa} \Leftrightarrow \ln(P_d) = -\ln\left(\sqrt{\frac{\kappa}{\phi}}\right) - \frac{\beta}{2}\sqrt{g} + \frac{1}{2}\ln(A'), \quad (12)$$

wherein $A' = \frac{B_v^\infty}{\phi} A$ and since $\frac{B_v^\infty}{\phi} \approx 1.1$, $A' \approx 557000$ md·psi$^2$ for most pore systems.

Inserting equation (11) into equation (12) yields:

$$\frac{-g}{\ln \tilde{S}} \approx \ln(h) + \ln(\Delta\rho) - \ln(\sigma \cos\theta) + 5.1 + \ln\left(\sqrt{\frac{\kappa}{\phi}}\right) + \frac{\beta}{2}\sqrt{g} - \frac{1}{2}\ln(A'). \quad (13)$$

Equation (13) can be simplified into the following expression:

$$\ln\left(h\sqrt{\frac{\kappa}{\phi}}\right) \approx \frac{-g}{\ln \tilde{S}} - \frac{\beta}{2}\sqrt{g} + W, \quad (14)$$

wherein $W = \ln(\sigma\cos\theta) - \ln(\Delta\rho) + \frac{1}{2}\ln(A') - 5.1$. (15)

Noting that A'=557000 md psi, the new parameter W can be simplified to the following: W=ln(σ cos θ)−ln(Δρ)+1.5, where σ cos θ is the wettability and Δρ is the difference in density between oil and water. Note that W is only dependent on general rock and fluid parameters, i.e. interfacial tension and fluid density contrast between water and oil and should generally be constant for the whole reservoir (or at least very slowly varying). A typical value for W for carbonate oil reservoirs is: W≈ln(13/0.35)+1.5=5.1.

Figure 2:
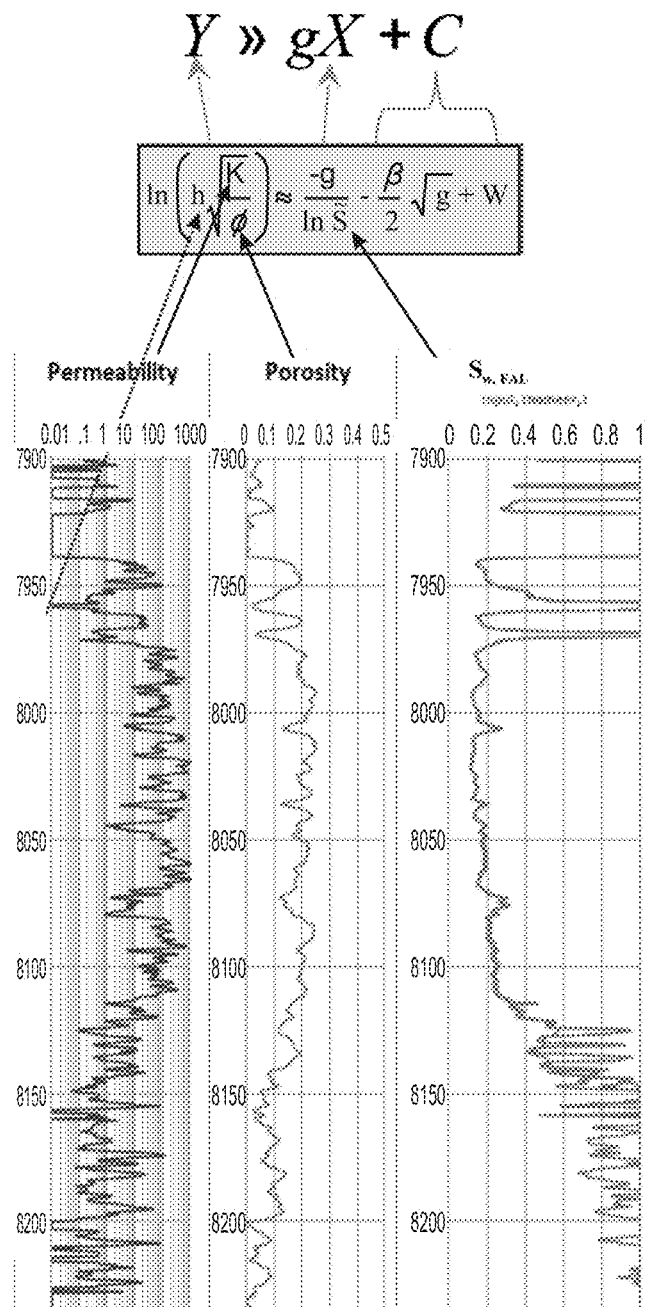
FIG. 2 is a graph illustrating a connection between portions of a saturation height function with well log data according to an embodiment of the present invention.

FIG. 2 illustrates the connection of equation (14) with well log data. Since from the well logs, height h, permeability κ, porosity ϕ, and oil saturation Š are known or derived, when W for the reservoir is known (by proxy), the poro-elastic constant g can be estimated from equation (14). Where W is not known, equation (14) defines a relation between W and g, which can be exploited as described below. Note, g generally varies from well-to-well.

Figure 3:
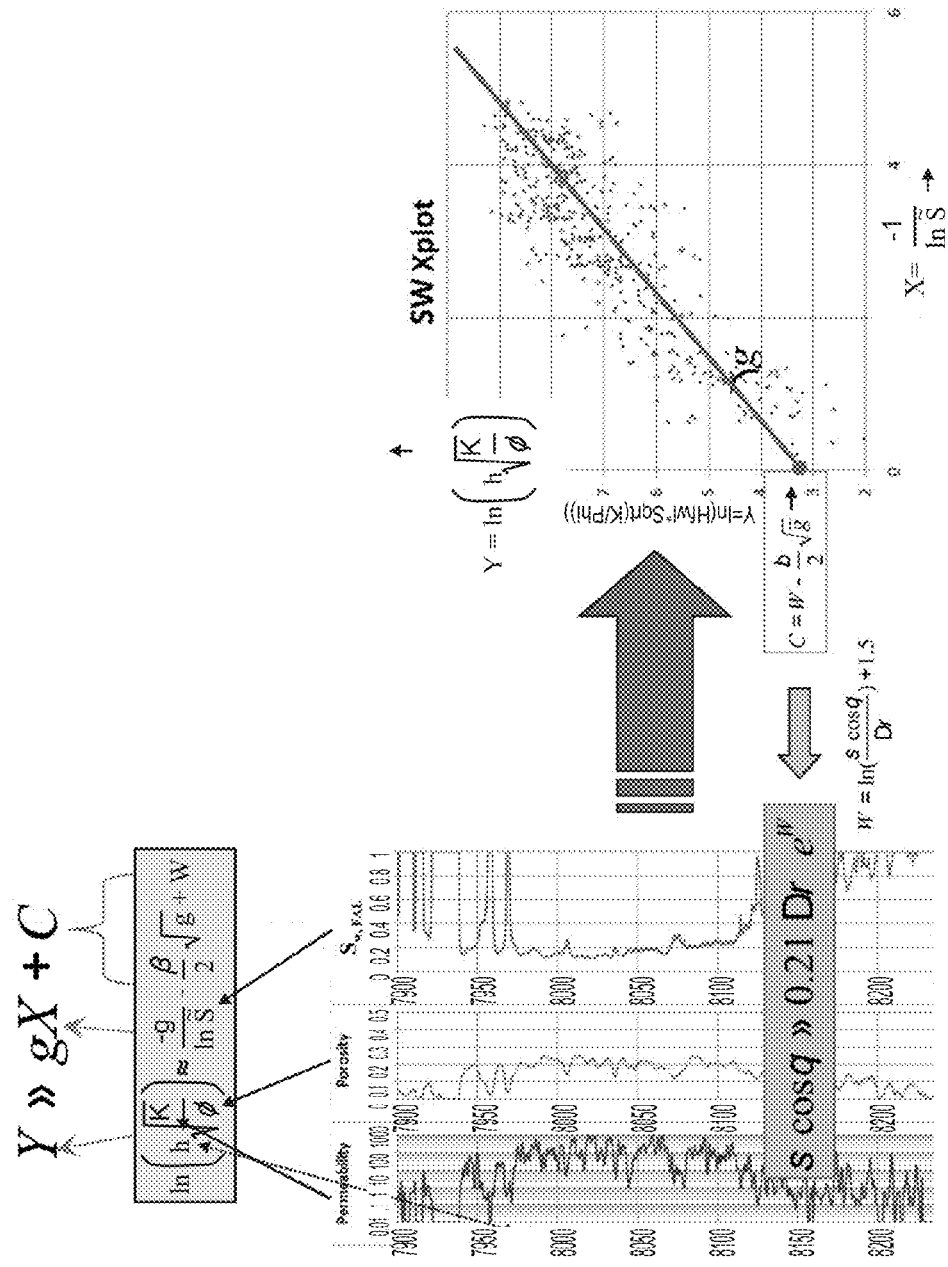
FIG. 3 is a data flow diagram illustrating development of a statistical cross plot according to an embodiment of the present invention.

As illustrated in FIG. 3, equation (14) can be rewritten in the form of: Y≈gX+C
where:

$$Y = \ln\left(h\sqrt{\frac{\kappa}{\phi}}\right), X = \frac{-1}{\ln \tilde{S}}, \text{ and } C = W - \frac{\beta}{2}\sqrt{g}.$$

B. Core Workflow

Figure 4:
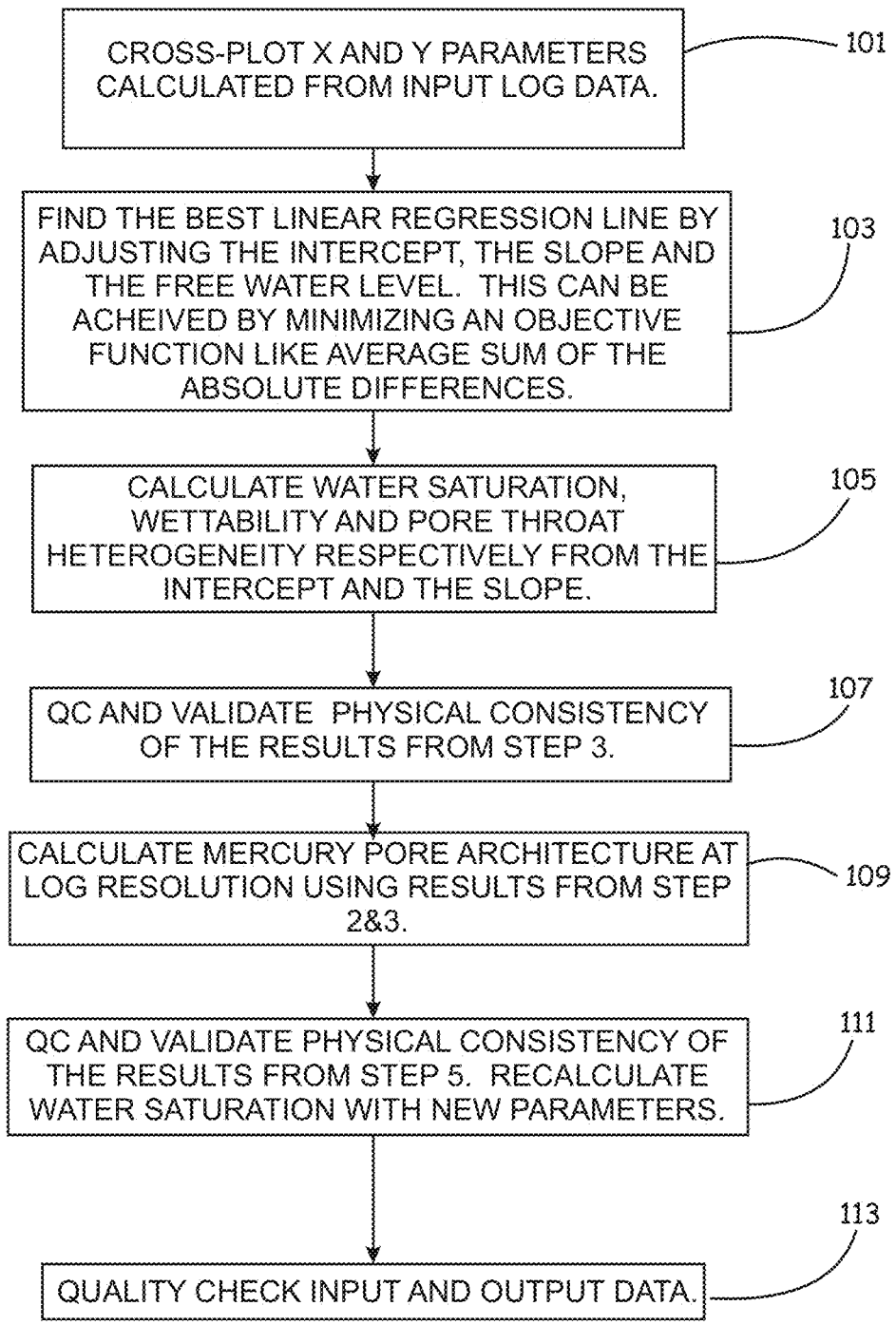
FIG. 4 is a schematic flow diagram illustrating a workflow for quantifying well constants, determining well parameters and the pore architecture, and for performing quality control and validation analysis according to an embodiment of the present invention.

FIG. 4 illustrates a high level flow diagram illustrating steps/operations for quantifying well constants, calculating pore architecture, and performing quality control and validation checks, which illustrates links to various mathematical formulas associated with the respective steps, according to an example of embodiment of the present invention. The major steps shown in the figure, according to the exemplary embodiment, include forming an X and Y cross plot of parameters calculated from input log data (item 101), finding the best linear regression line through it (see, e.g., line 61, FIG. 6) by adjusting the intercept 63 or C, slope 65 or g, and/or free water line (item 103), calculating well constants/parameters to include water saturation, wettability, and pore throat heterogeneity/pore geometrical factor (item 105), performing quality control and validation of physical consistency of the results of the well constants calculations (item 107), calculating pore architecture at log resolution level using the values of the calculated well constants and input log data (item 109), performing quality control and validation of the physical consistency of the results of the pore architecture calculations (item 111), and performing a global quality check of input and output data (item 113), described below.

Figure 5:
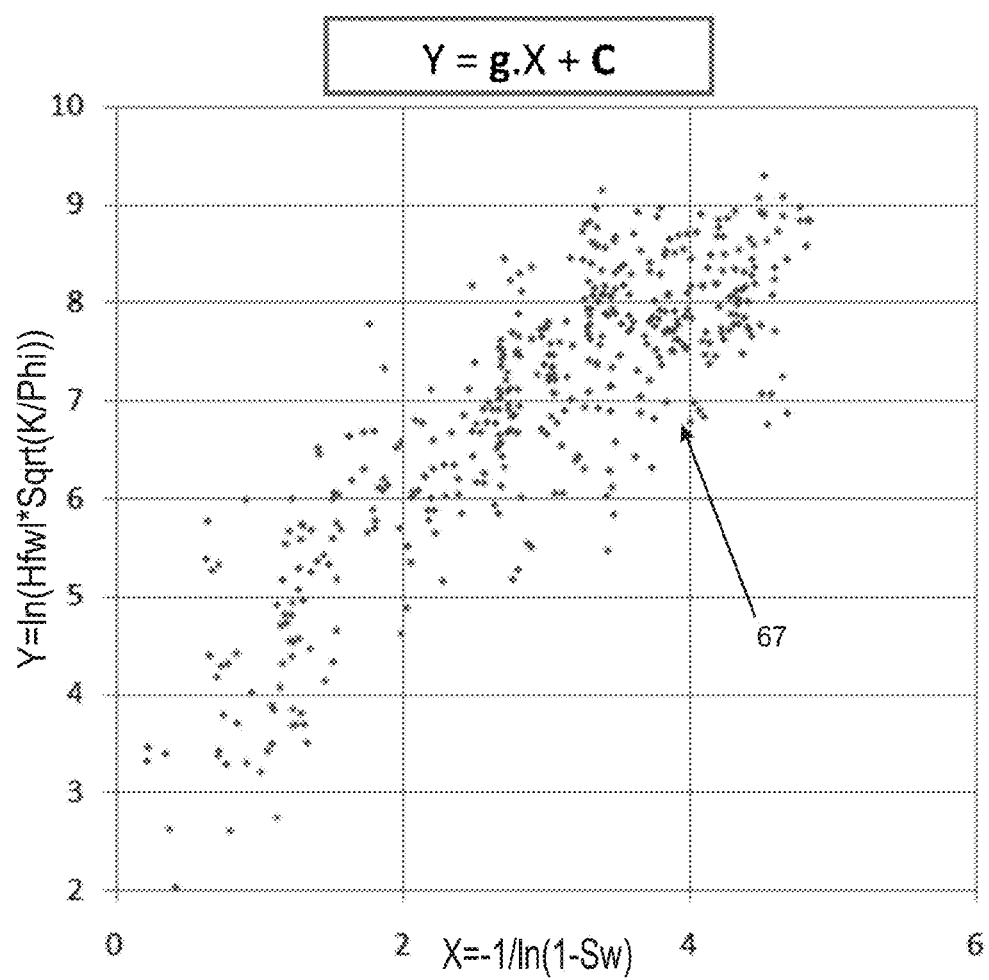
FIG. 5 is a graph illustrating data plots of the log data according to an embodiment of the present invention.

1. Formation of an X and Y Cross Plot of Parameters Calculated from Input Log Data FIG. 5 illustrates an example of individual data points 67 forming a statistical cross plot. According to an exemplary configuration, the step/operation of forming an X and Y cross plot includes extracting data from well logs from one or more wells, e.g., permeability κ, porosity ϕ, and entering the respective data. As can be seen in the figure, the x-axis varies with saturation, while the Y axis carries the rock parameters via permeability κ and porosity ϕ plus the fluid densities Δρ. The x-axis and y-axis, respectively, can take the following forms:

$$Y = \ln\left(h\sqrt{\frac{\kappa}{\phi}}\right), X = \frac{-1}{\ln \tilde{S}}.$$

2. Determination of the Best Fit Line Through the X-Y Cross Plot and Calculation of Well Constants/Parameters a. Solution Via a Linear Approximation—Linear, Single Solution of "g"

To enable a solution to equation (14), a linear approximation to √g is introduced whereby √g≈λg+√g$_o$, where λ≈0.5 and g$_o$≈0.16. This approximation to √g simplifies the derivation and provides a fit which is optimized for g-values between 0.2 and 2.5, typical for carbonate systems. Utilizing the linear approximation, equation (14) becomes:

$$\ln\left(h\sqrt{\frac{\kappa}{\phi}}\right) \approx g\left(\frac{-1}{\ln \tilde{S}} - \lambda\frac{\beta}{2}\right) + W - \frac{\beta}{2}\sqrt{g_e}, \quad (16)$$

wherein $\lambda\frac{\beta}{2} \approx 0.73$ and $\frac{\beta}{2}\sqrt{g_e} \approx 0.58$.

Inserting the expression for W of equation (15) gives:

$$\ln\left(h\sqrt{\frac{\kappa}{\phi}}\right) \approx g\left(\frac{-1}{\ln \tilde{S}} - \lambda\frac{\beta}{2}\right) + \quad (17)$$

-continued $$\ln(\sigma \cos\theta) - \ln(\Delta\rho) + \frac{1}{2}\ln(A') - 5.1 - \frac{\beta}{2}\sqrt{g_e}.$$

Transferring all the known constants to the left-hand side yields:

$$\ln\left(h\sqrt{\frac{\kappa}{\phi}}\right) + \ln(\Delta\rho) - \frac{1}{2}\ln(A') + 5.1 + \frac{\beta}{2}\sqrt{g_e} \approx g\left(\frac{-1}{\ln\tilde{S}} - \lambda\frac{\beta}{2}\right) + \ln(\sigma\cos\theta). \quad (18)$$

Filling in the known constants, the expression becomes:

$$\ln\left(h\sqrt{\frac{\kappa}{\phi}}\right) + \ln(\Delta\rho) - 1 \approx g\left(\frac{-1}{\ln\tilde{S}} - \lambda\frac{\beta}{2}\right) + \ln(\sigma\cos\theta). \quad (19)$$

By defining new parameters in the following way:

$$X = \frac{-1}{\ln\tilde{S}} - \lambda\frac{\beta}{2} \text{ and } Y = \ln\left(h\sqrt{\frac{\kappa}{\phi}}\right) + \ln(\Delta\rho) - 1 \text{ (or } 0.97), \quad (20)$$

one can obtain a simple linear expression as follows:

$$Y \approx gX + \ln(\sigma \cos\theta) \quad (21)$$

Figure 6:
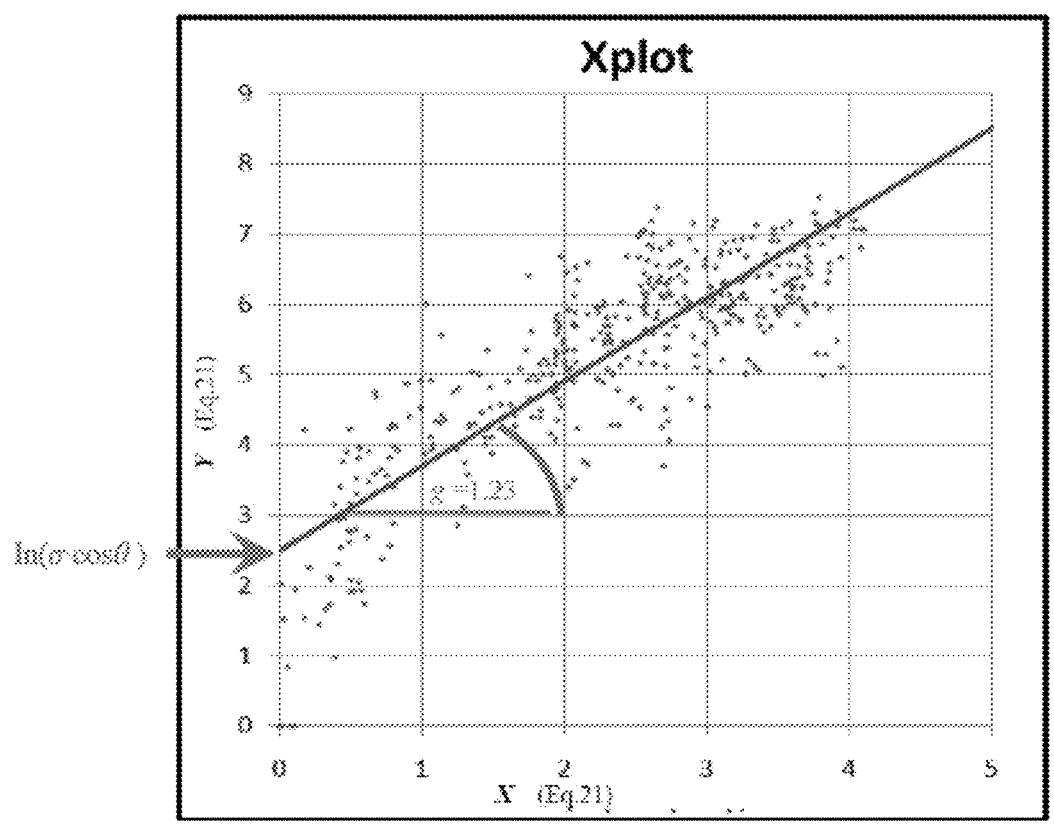
FIG. 6 is a graph illustrating a linear regression plot of data points according to an embodiment of the present invention.

This simplified linear equation defines a line in the X-Y plane, where the slope is given by the poro-elastic constant g and the intercept determines the wettability ($\sigma \cos \theta$). Typical values for g in carbonate oil reservoirs would be g≈0.7-1.0. The variables X and Y can be determined from well log data over a certain reservoir interval, either from a single well or from a whole suite of wells in a reservoir. Both variables vary with depth and location of the well. The X variable varies with saturation $\tilde{S}$, while Y carries the rock parameters via permeability κ and porosity φ plus the fluid densities via Δρ. The log derived X and Y values yield a statistical cross plot in the (X, Y) plane as shown in FIG. 5, for example, from which the linear regression equation can be derived. The linear regression yields the statistically best fit for slope g and the Y intercept ln(σ cos θ), and thus, σ cos θ as shown in FIG. 6.

Figure 7:
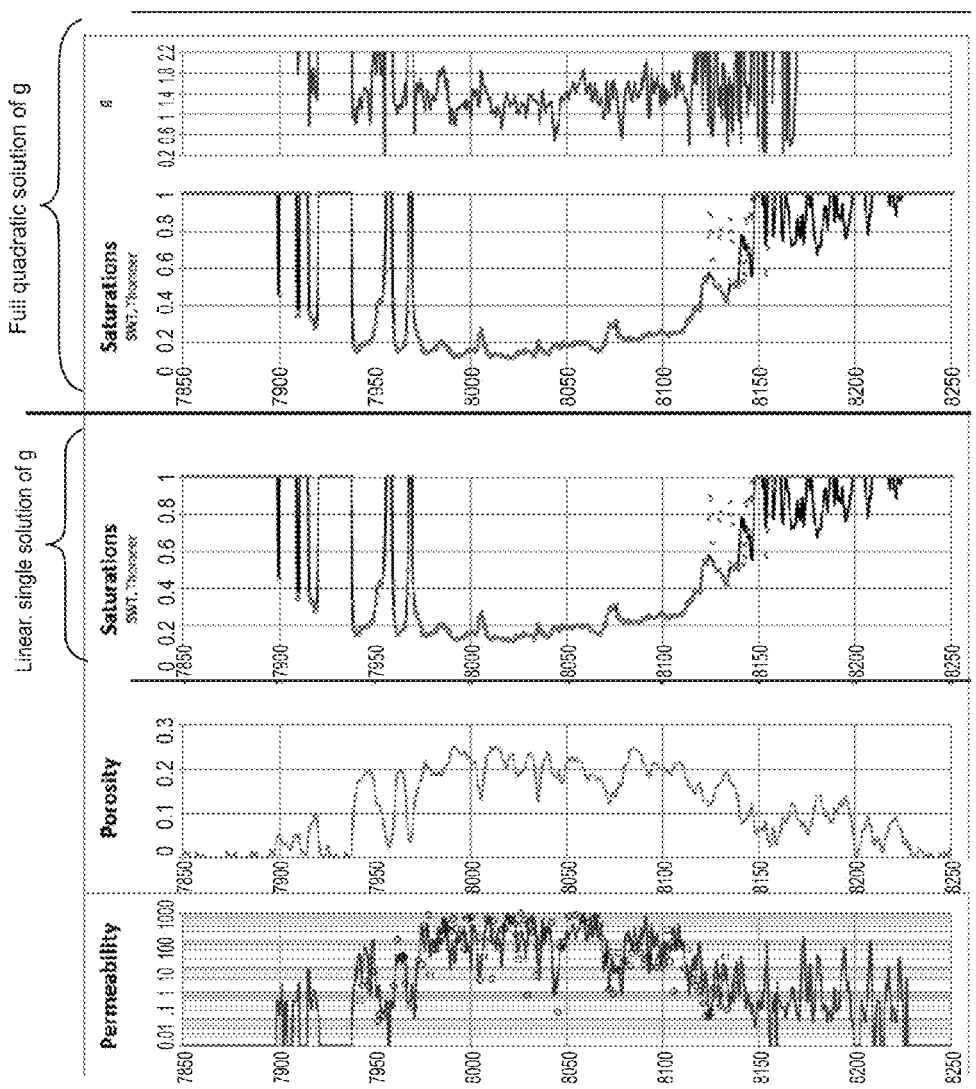
FIG. 7 is a graph illustrating comparative saturation height responses according to an embodiment of the present invention in comparison with baseline data and according to prior techniques.

These parameters can be used to estimate saturations via equation (14) and wettability via equation (15). An example of the determine saturation is provided in FIG. 7. Specifically, FIG. 7 illustrates comparative plots showing establishment of the values for saturation calculated according to one or more embodiments of the present invention and the values provided by the Leverett J function. Note, the Leverett-J function is a Power function where the Thomeer function is a Hyperbolic function.

b. Solving the Poro-Elastic Constant "g"—the Full Quadratic Solution.

As described above, embodiments of the method also yield the W parameter defined in equation (15). In principle, W is a global reservoir parameter, a fact that can be used to make a much more precise match with the log derived water saturations. First, we note that equation (14) can be rearranged in the form of a standard quadratic equation. Rearranging equation (14) and setting x=√g, yields the following:

$$\frac{-g}{\ln\tilde{S}} \approx \ln\left(h\sqrt{\frac{\kappa}{\phi}}\right) - W + \frac{\beta}{2}\sqrt{g} \Leftrightarrow \quad (22)$$

$$\frac{-g}{\ln\tilde{S}} - \frac{\beta}{2}\sqrt{g} - \ln\left(h\sqrt{\frac{\kappa}{\phi}}\right) + W = 0$$

which yields:

$$\frac{-1}{\ln\tilde{S}}x^2 - \frac{\beta}{2}x - \ln\left(h\sqrt{\frac{\kappa}{\phi}}\right) + W = 0, \quad (23)$$

which is a standard quadratic equation of the form $ax^2 + bx + c = 0$, where:

$$a = \frac{-1}{\ln\tilde{S}}; b = -\frac{\beta}{2} \text{ and } c = -\ln\left(h\sqrt{\frac{\kappa}{\phi}}\right) + W.$$

The quantities a, b, and $$\ln\left(h\sqrt{\frac{\kappa}{\phi}}\right)$$

can be calculated from the log data. Since the global W-parameter can be obtained via the linear fitting method described previously, we now have all three coefficients a, b, and c, and thus, are able to solve equation (23). There are two possible solutions:

$$x_{\pm} = \frac{1}{2a}\left[-b \pm \sqrt{b^2 - 4ac}\right] = \quad (24)$$

$$-\frac{1}{2}\ln\tilde{S}\left[\frac{\beta}{2} \pm \sqrt{\frac{\beta^2}{4} - 4\frac{-1}{\ln\tilde{S}}\left(-\ln\left(h\sqrt{\frac{\kappa}{\phi}}\right) + W\right)}\right],$$

or $$x_{\pm} = -\frac{\beta}{4}\ln\tilde{S}\left[1 \pm \sqrt{1 + \frac{16}{\beta^2\ln\tilde{S}}\left(W - \ln\left(h\sqrt{\frac{\kappa}{\phi}}\right)\right)}\right]. \quad (25)$$

Next, we define the discriminant D as:

$$D = 1 + \frac{16}{\beta^2\ln\tilde{S}}\left\{W - \ln\left(h\sqrt{\frac{\kappa}{\phi}}\right)\right\}. \quad (26)$$

Equation (25) can then be expressed as:

$$x_{\pm} = -\frac{\beta}{4}\ln\tilde{S}\left[1 \pm \sqrt{D}\right] \quad (27)$$

Note that since $\tilde{S}<1$, $x_+$ is always positive, while $x_-$ can become negative depending on the value of D. The discriminant D must always be greater or equal to 0. There are two solutions for g: $g_\pm = x_\pm^2 > 0$ and for every g, a complete set of Thomeer parameters are obtained using equation (8):

$$g_\pm = x_\pm^2 \geq 0 \begin{cases} \{B_v^\infty, g_-, P_{d-}\} \\ \{B_v^\infty, g_+, P_{d+}\}, \end{cases} \quad (17)$$

wherein $B_v$ is the bulk volume, g is the poro-elastic constant, and $P_d$ is the minimum entry pressure. Such parameters can be used to readily estimate water- and oil-saturations or in-reservoir modeling. The "+" solutions are the preferred ones.

Figure 8:
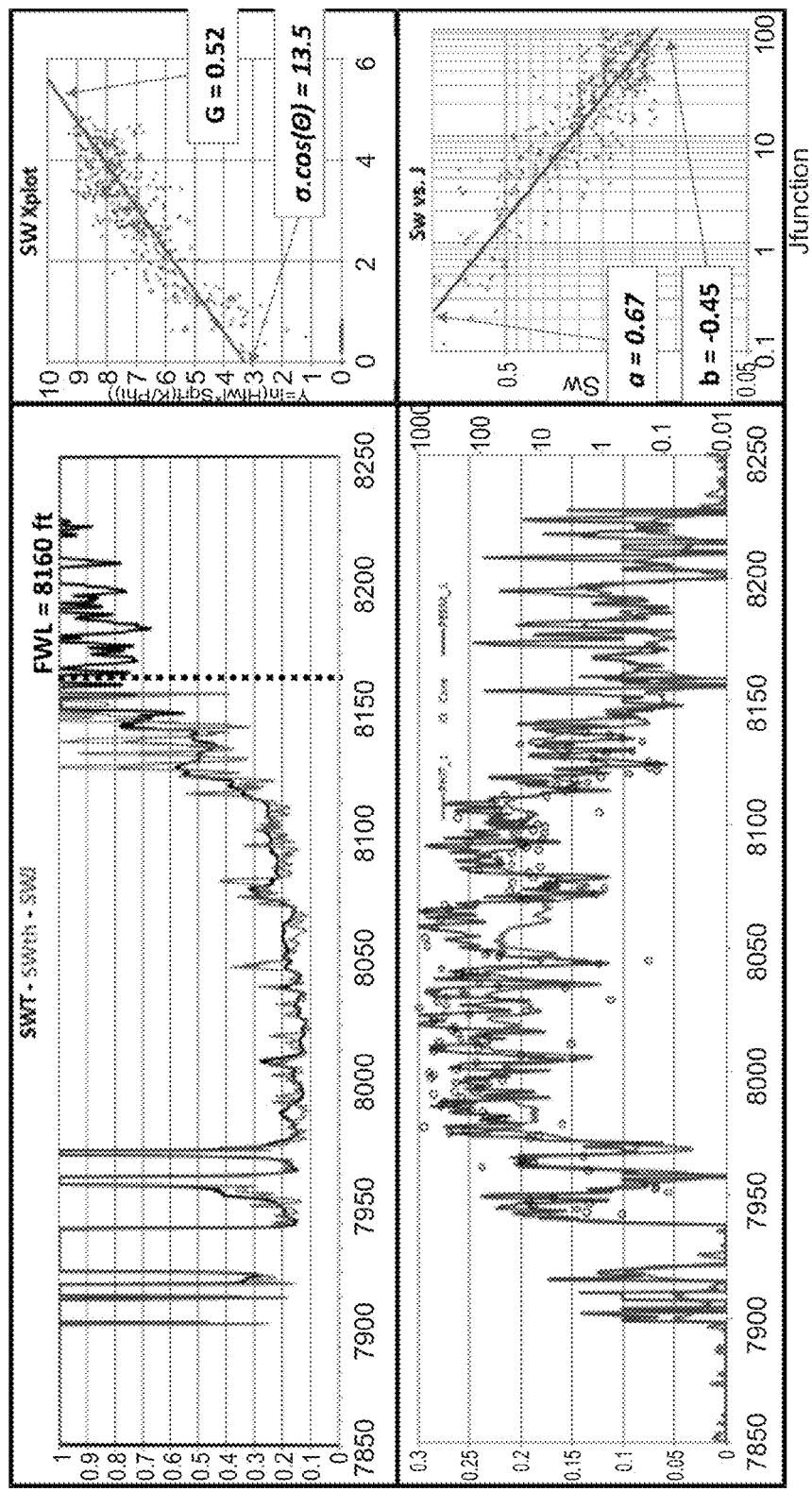
FIG. 8 is a graph illustrating a comparison of results of determining the poro-elastic constant g using a simple linear solution and a full quadratic solution according to embodiments of the present invention.

These Thomeer parameters and the other (global) parameters can be used to estimate the water saturation. The result is shown in graphical illustration presented in FIG. 8, which provides an example of fitting well log derived water saturation ("SWT" via Archie with n=m=2) using the two techniques described above, i.e., (1) via employment of the constant (average) g ("Linear, single solution of g"), and (2) the employment of the full resolved g values approach ("Full, quadratic solution of g"), to provide a saturation value comparison therebetween. The fit can be perfect, or at least near perfect, when the physics of the balance between capillarity and buoyancy is honored. In the right most panel the calculated g-values are plotted, which shows a heterogenic picture, normally for carbonates. Nevertheless the values are all reasonable and the average value agrees with the value (slope) calculated in the linear fitting method. Note, that in the zone just above the FWL, there are some discontinuities owing to the fact that the discriminant D (value under the square root) becomes negative, and therefore, unphysical.

As expected this quadratic solution approach result fits the log derived water saturations ("SWT" curves) much better than the linear fitting approach. The precise result, however, can generally only be reasonably obtained when, for example, the free water level and average wettability are known or estimated using the linear fitting method. The two methods, are thus, complementary.

Figure 9:
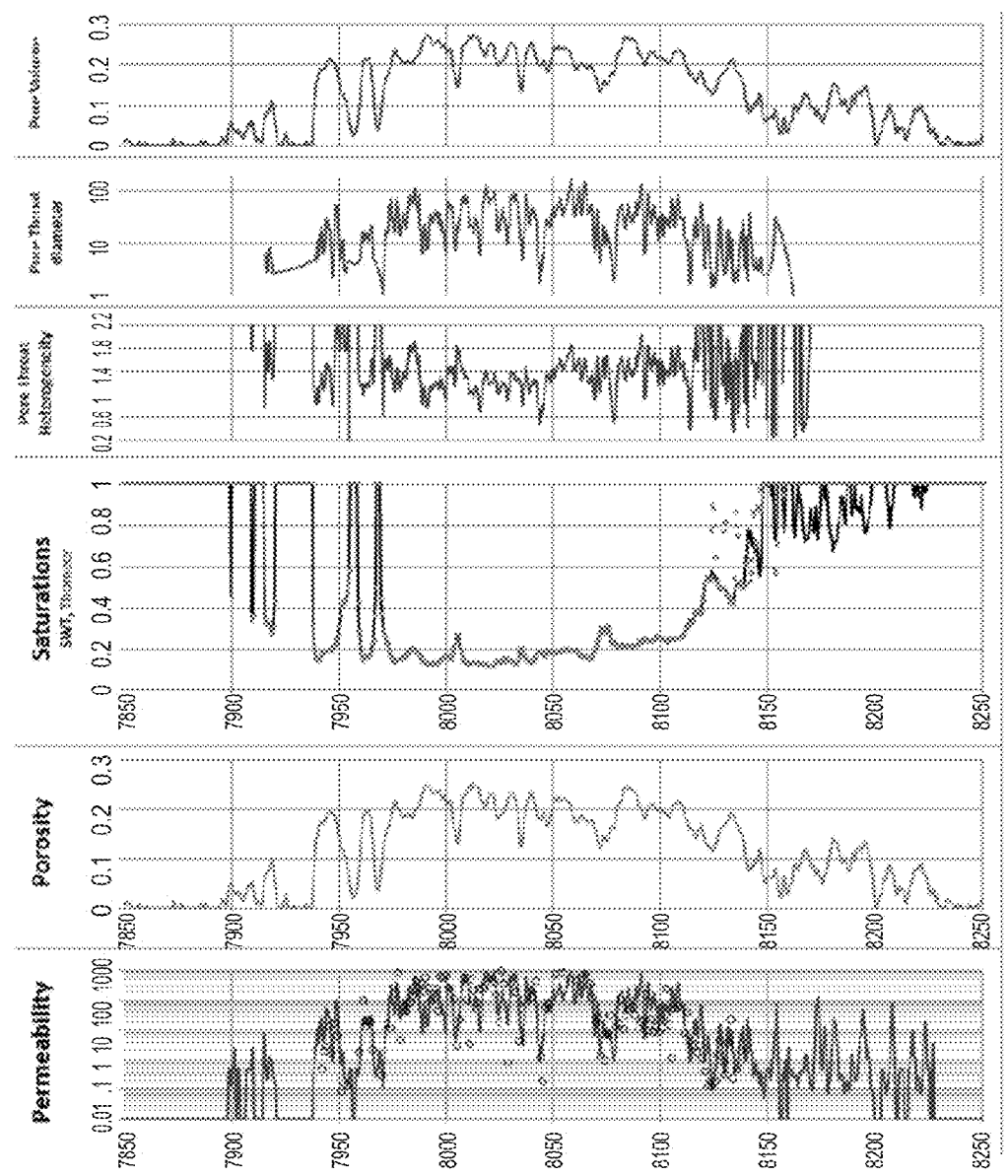
FIG. 9 is a graph illustrating comparative responses between well log data and well parameters/constants according to an embodiment of the present invention.

FIG. 9 graphically illustrates the results of utilization of the quantified well constants to characterize pore architecture (e.g., pore heterogeneity, pore throat size, and pore volume at log resolution) according to one or more embodiments of the present invention.

3. Practical Approximation Workflow for Quadratic Solution Choice

Because the mathematically correct answers to solve the pore architecture configuration are found by solving a quadratic solution, there are two sets of possible solutions for each $\kappa$, $\phi$, and $S_w$ inputs. Only one, however, set makes physical sense.

Figure 10:
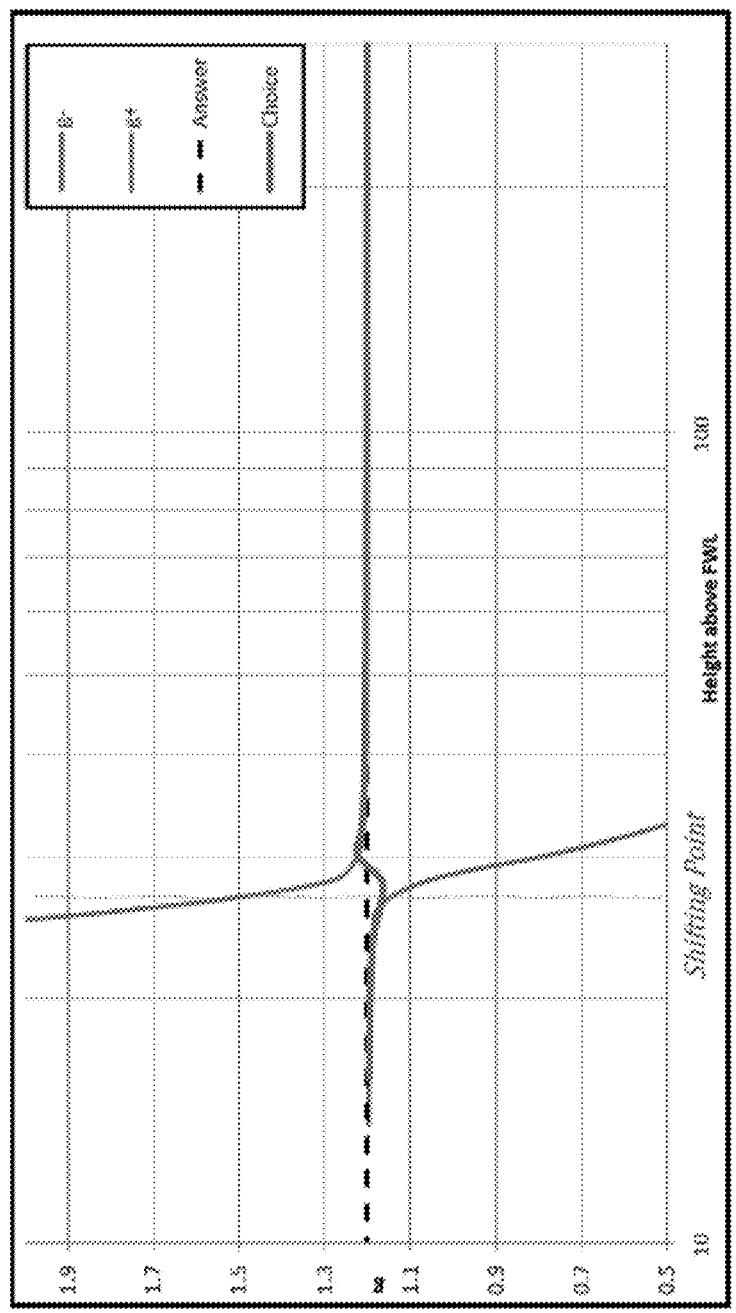
FIG. 10 is a graph illustrating a shifting point between a pair of quadratic solutions.

As shown in FIG. 10, the actual shifting point between the two quadratic solutions happens when the Discriminant (D) equals 0 or when $x_- * x_+ = 1$. This point can also be calculated in terms of Height Above Free Water Level ($H_{fwl}$) as follows:

$$H_{fwl,D=0} = \frac{\tilde{S}\frac{\beta^2}{16} * e^W}{\sqrt{\frac{\kappa}{\phi}}}.$$

wherein, whenever $H_{fwl} = H_{fwl,D=0}$, the equation solution changes: $x_-$ or $g_-$ below $H_{fwl,D=0}$, and $x_+$ or $g_+$ above $H_{fwl,D=0}$.

Due to the semi-empirical aspect of this approach integrating empirical formalism (Thomeer Saturation height equation) and physics first principle models, it is very complicated to find on which side of the shifting one is situated. The quadratic solution choice, however, can be approached from a practical point of view, leading to a practical approximation.

4. Algorithm for Practical Approximation

For physical values $G \in [0.1; 1.2]$.

if $g_+ > 1.2*\ln(10)$ and $\Delta > 0$ if $\frac{H_{fwl,D=0}}{H_{fwl}} < 0.95$ and $x_- > 0$ then $g = \frac{g_+ + g_-}{2}$ if $\frac{H_{fwl,D=0}}{H_{fwl}} > 0.95$ and $x_- < 0$ then $g = g_+$ if $g_- > 0.1*\ln(10)$ and $\Delta > 0$ then $g = g_-$ wherein $G = g/\ln 10$.

For unphysical values $G \notin [0.1; 1.2]$.

if $g_+ > 1.2*\ln(10)$ and $g_- < 0.1*\ln(10)$ and $\Delta > 0$ then $$g = \frac{g_+ + g_-}{2}.$$

Because the average of g+ and g− can also be out of the physical bound, an extra condition has been applied to the upper limit whereby:

if $g_+ = 1.2*\ln(10)$ and $Sw_{thomeer} < 0.99$ then $g = g_+$.

C. Clastic Environment

The X-Y plot used for determining the pore geometry factor and wettability estimation, as described previously, have been found to be deficient when applied to clastic rocks. Further, the results were very much unchanged regardless of whether or not effective or total porosities and water saturations were used 1. $V_{shale}$ Sensitivity Analysis a. Effective and Total Porosity/Water Saturation Clastic rocks can be considered as a form of bimodality where the water saturation in the first pore system (sand) is controlled by the balance between buoyancy and capillary pressure, whereas the second pore system (Shale) only has capillary bound water. As such, it has been found that the two porosities can/should be separated to characterize properties such as, for example, water saturations.

Figures 11A, 11B:
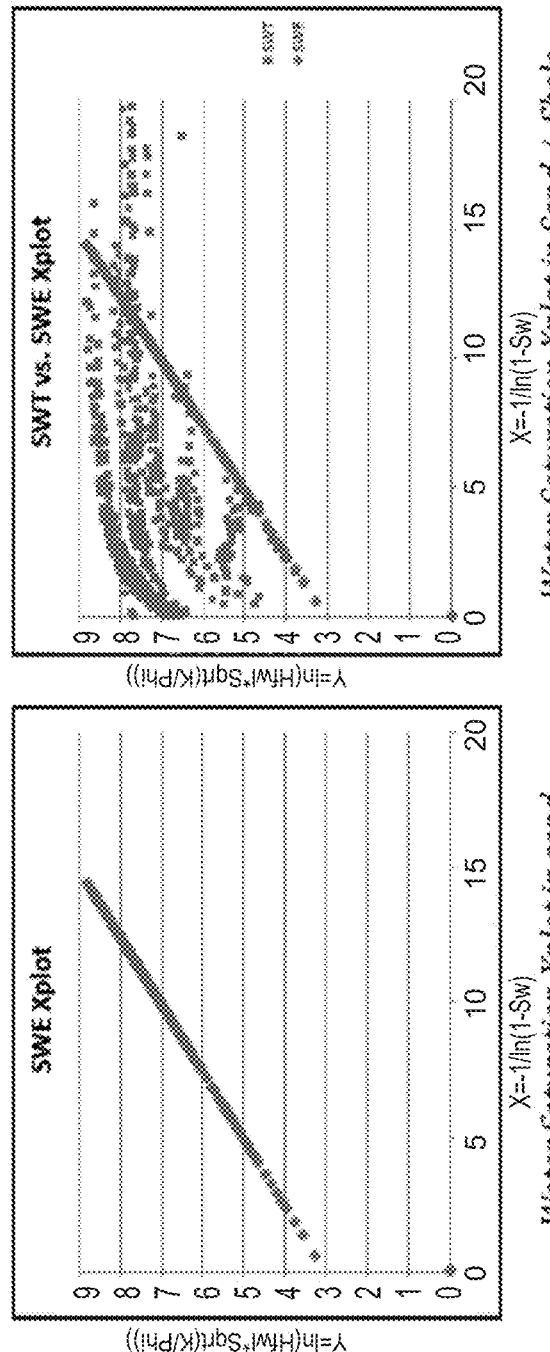
FIGS. 11A and 11B are graphs illustrating an effect of a $V_{shale}$ on water saturation characterizations.

An experiment was performed to assess the impact of $V_{shale}$ on water saturation characterizations and whether $V_{shale}$ would result in a masking of the underlying physical buoyancy/capillary pressure equilibrium. The experiment included computing an effective water saturation (SWE) based on permeability $\kappa$, porosity $\phi$, and free water level $H_{fwl}$, and a pore throat heterogeneity G=0.15 (well sorted sand), adding the $V_{shale}$ component (sand+shale), and comparing a plot of SWE with total water saturation (SWT). The plots (FIGS. 11A and 11B) show that the physical signature of buoyancy/capillary pressure equilibrium could not be properly identified using total water saturation according to the exemplary embodiment of the present invention. Particularly, it was determined that the underlying physical mechanism becomes distorted by another mechanism (capillary bound water) and the resultant X plot was therefore nothing but a weighted average of the two processes.

b. Sensitivity to Bias and Uncertainty (Noise)

An experiment was performed to assess whether inaccuracies in the $V_{shale}$ amount estimation could mask the underlying physical process of buoyancy/capillary pressure equilibrium. The experiment included, beginning with a given SWT and, assuming one has the perfect $V_{shale}$, (1) calculating the X and Y variable of an X-Y plot using SWE, and (2) adding bias in random noise to the perfect $V_{shale}$ to mimic under/over estimation and uncertainty.

Figure 12:
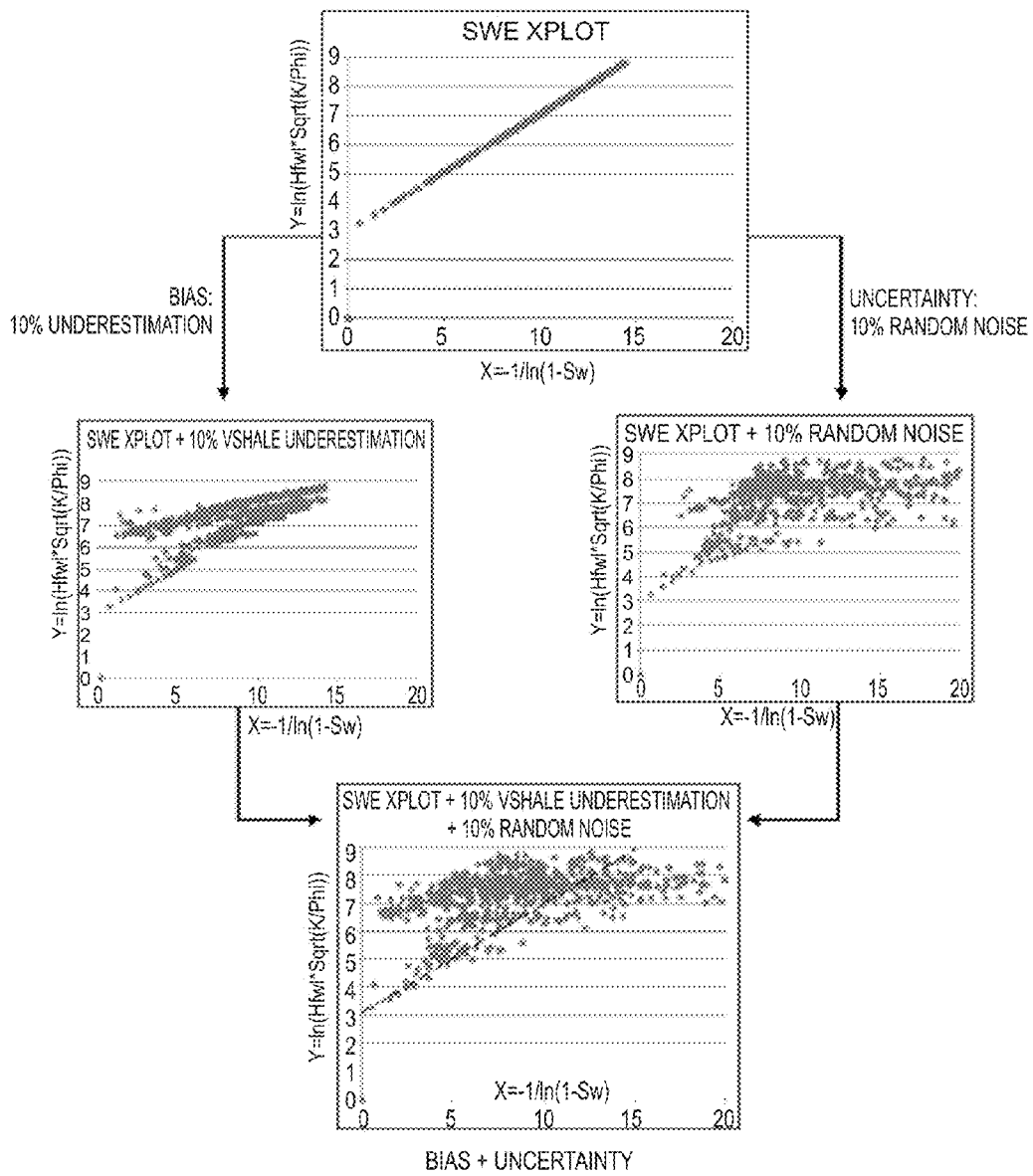
FIG. 12 is a graph illustrating an effect of bias and uncertainty on water saturation characterizations.

As shown in FIG. 12, with only a small underestimation and/or noise component, one can observe the original straight line trend (characteristic from the buoyancy/capillary pressure equilibrium), has almost completely disappeared from the cloud geometry. It was therefore surmised that, in actual field data, the uncertainty in $V_{shale}$ is such that the signature of underlying physical phenomena that is "ruling" the oil saturation process, gets distorted. It was therefore concluded that the above-described regression technique or techniques, at least according to a preferred implementation, would not provide information of sufficient quality. This is because it highly relies on good quality data, and more importantly, raw and interpreted data that are consistent with each other (i.e. honoring the same physical principles). Notably, similar results were also found when testing J-function methodologies.

2. Gas a Function of $V_{shale}$

A plurality of solutions were tested and successful in a clastic environment. One methodology assumes the G pore geometrical factor is controlled by the amount of $V_{shale}$ as follows:

$$G = G_{shale} * V_{shale} + G_{sand} * (1 - V_{shale}),$$

with $G_{shale} \approx 1$ and $G_{sand} \approx 0.15$.

This is a reasonable assumption in the case where permeability is texturally controlled. The more clay, the lower the depositional energy, the finer are the sand grains, and the heavier is the grain size distribution tail. Once the G parameter is solved, water saturation can be readily calculated using the equations described above (e.g., the Buiting-Clerke permeability modified Thomeer saturation height function).

3. Oil Saturation Calculation Using G as a Function of $V_{shale}$

According to an exemplary configuration, and the oil saturation calculation can be performed using G as a function of $V_{shale}$ by employing, for example, the following equations:

$$B_v^{\infty} = A * \phi_{he} + B \text{(Conversion from Mercury to Helium Porosity)}$$

$$K_a = 506000 * \frac{B_v^{\infty}}{P_d^2} * e^{-4.33 * \sqrt{G}}$$

then $$P_d = \sqrt{506000 * \frac{A - \phi_{he} + B}{K_a} * e^{-4.33 * \sqrt{G}}}$$

$$S_{Hc} = \frac{K_v^{\infty}}{\varphi} + e^{\log\left(\frac{P_{cHg}}{P_{dHg}}\right)\frac{-G}{}} \text{ with } Pc_{Hg} =$$

$$\frac{H_{FWL} * 0.434 + (\rho_b - \rho_{Hc}) * \sigma * \cos(\theta)_{Hg/a}}{\sigma * \cos(\theta)_{b/Hc}}.$$

Utilizing the above calculations, a $V_{shale}$ correction can be applied as described in Hill and Shirley (1979) where $S_{Hc} = (1 - V_{shale}) * S_{Hc}$, which basically treats shales as a second pore system never filled with oil (i.e., always filled/bounded with water).

D. Exemplary Case Study

Figure 13:
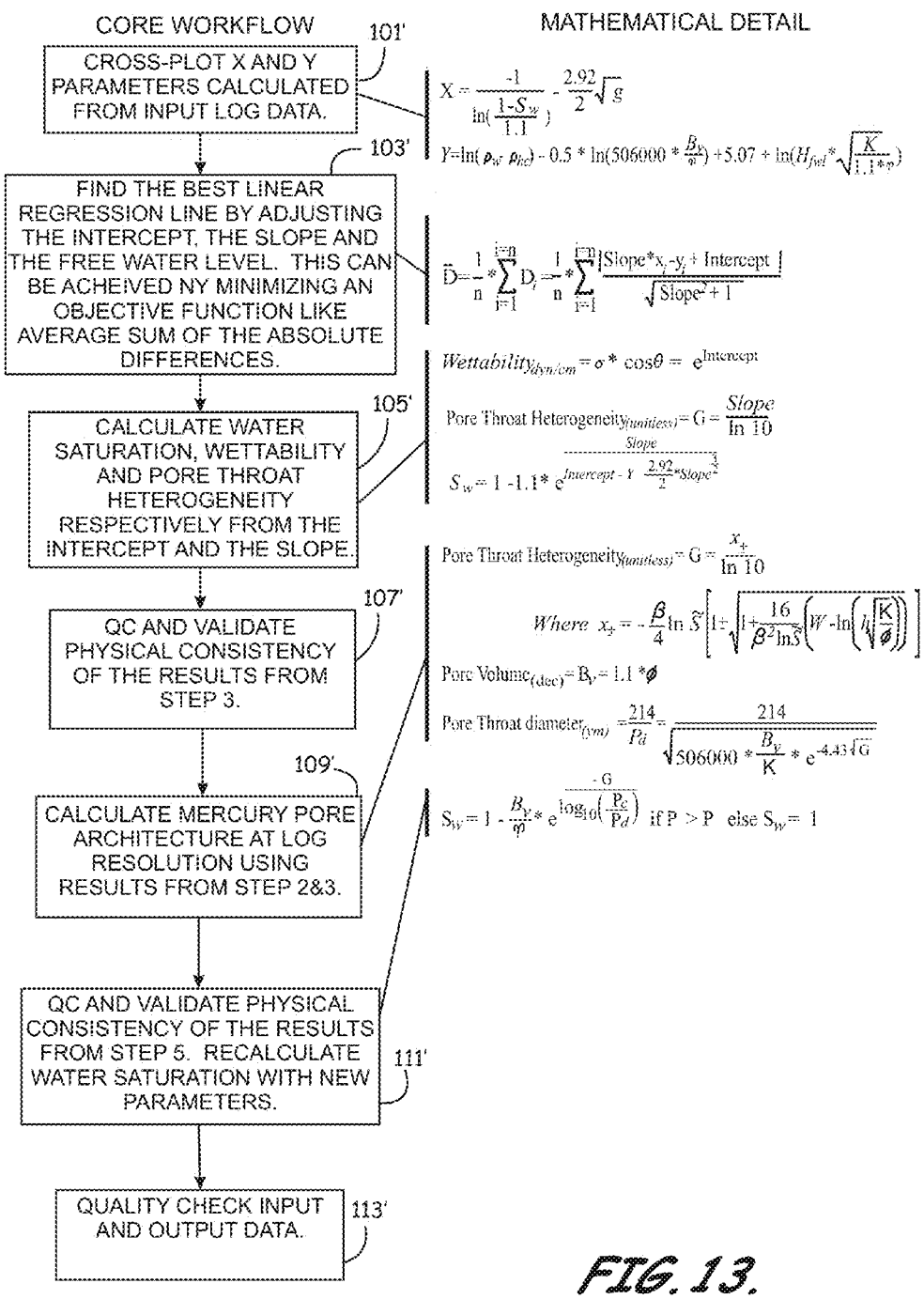
FIG. 13 is a schematic flow diagram illustrating workflow for quantifying well constants using well log data and the pore architecture at log resolution for a case study according to an embodiment of the present invention.

FIG. 13 illustrates a high level flow diagram illustrating steps/operations for quantifying well constants, calculating pore architecture, and performing quality control and validation checks, which illustrates links to various mathematical formulas associated with the respective steps, according to an example of embodiment of the present invention. According to the illustrated workflow, the steps include preparing or providing a cross-plot of X and Y parameters calculated from import log data (item 101') using the following equations:

$$X = \frac{-1}{\ln\left(\frac{1 - S_w}{1.1}\right)} - \frac{2.92}{2}\sqrt{g}$$

$$Y = \ln(\rho_w - \rho_{hc}) - 0.5 * \ln\left(506000 * \frac{B_v}{\varphi}\right) + 5.07 + \ln\left(H_{fwl} * \sqrt{\frac{K}{1.1 * \varphi}}\right).$$

The steps can also include finding the best linear regression line by adjusting the Y-intercept, the slope of the line, and the free water level (item 103'). According to an exemplary configuration, this can be achieved by minimizing an objective function such as the average sum of the absolute differences objective function. The average distance ($\overline{D}$) of orthogonal distances (D) between the data points and the regression line can be written as follows for (n) data points, as follows:

$$\overline{D} = \frac{1}{n} * \sum_{i=1}^{i=n} D_i = \frac{1}{n} * \sum_{i=1}^{i=n} \frac{|\text{Slope} * x_i - y_i + \text{Intercept}|}{\sqrt{\text{Slope}^2 + 1}}.$$

Having found the best linear regression line, the water saturation, wettability, and pore throat heterogeneity can be readily determined/extracted from the intercept and slope g/G of the line (item 105') using, for example, the following equations:

$$\text{Wettability}_{dyn/cm} = \sigma * \cos\theta = e^{\text{Intercept}}$$

$$\text{Pore Throat Heterogeneity}_{(unitless)} = G = \frac{\text{Slope}}{\ln 10}$$

$$S_w = 1 - 1.1 * e^{\text{Intercept} - Y - \frac{2.92}{2} * \text{Slope}^{\frac{3}{2}}}.$$

Figure 14:
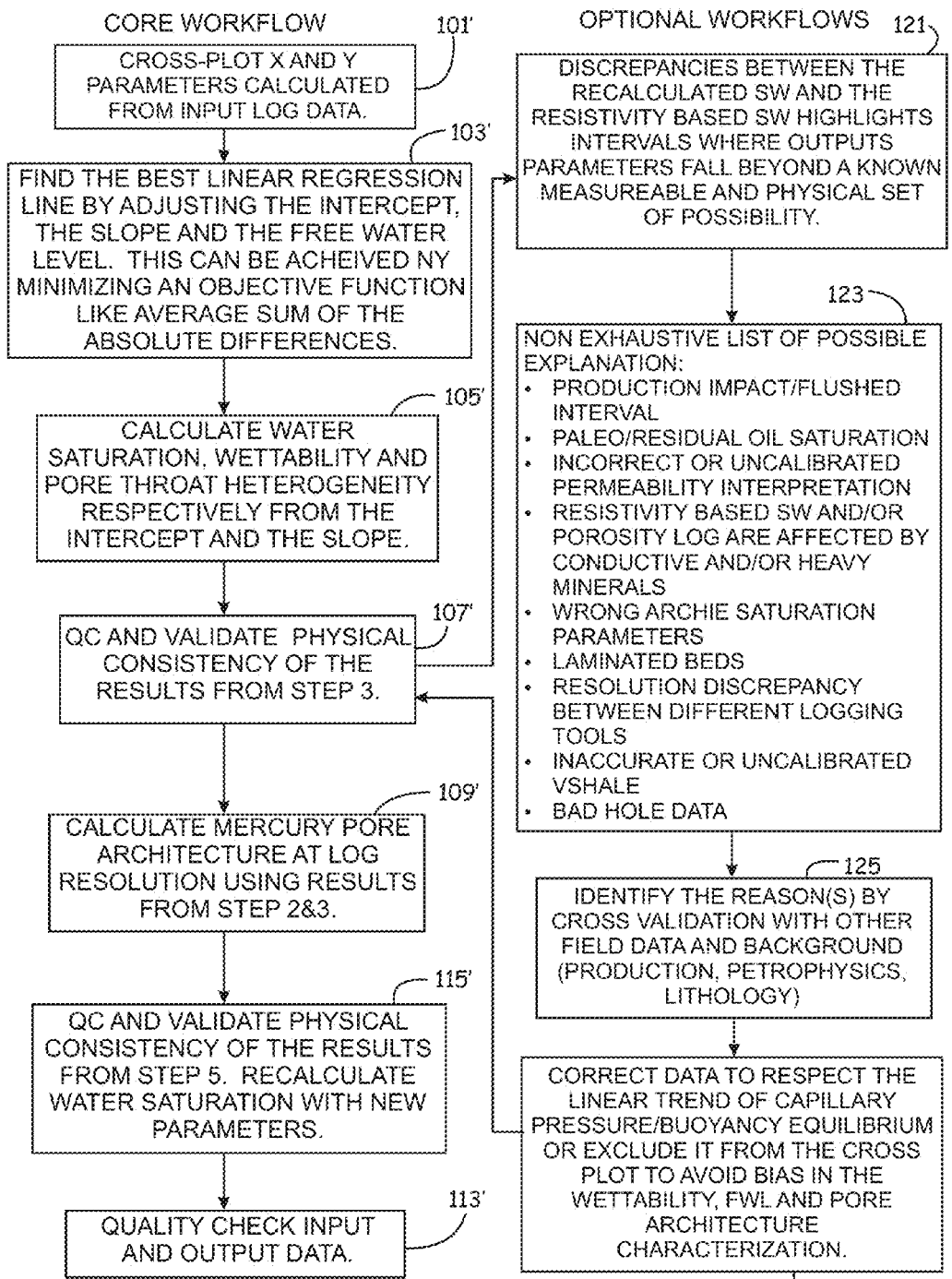
FIG. 14 is a schematic flow diagram illustrating steps for performing quality control and validation of the calculated well constants according to an embodiment of the present invention.
Figure 15:
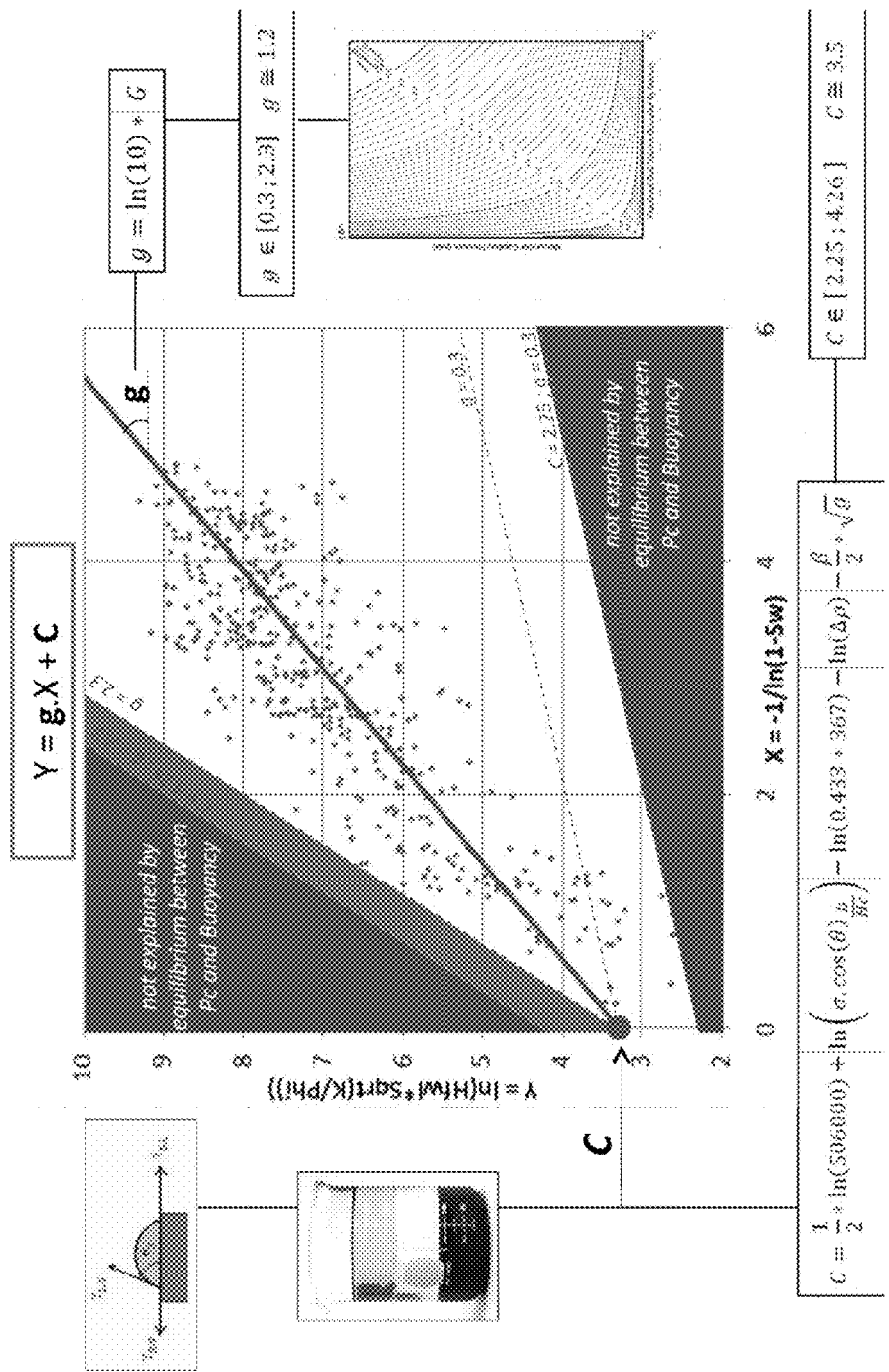
FIG. 15 is a graph illustrating an analysis of the data points of FIG. 6 according to an embodiment of the present invention.

FIG. 14 illustrates the step/operation of performing quality control and validation of physical consistency of the results of the well constants calculations (item 107') according to an embodiment of the present invention. Identification of inconsistencies can be readily discovered, for example, either graphically, such as through visualizing the results shown, e.g., in FIG. 15, or through the operations performed entirely within a computer. According to an exemplary configuration, when the data is found to not fall on a linear trend, and thus, does not respect equilibrium between capillary pressure and buoyancy (item 121), a list of possible explanations should be reviewed (item 123), and reasons for the discrepancies should be identified. FIG. 15 illustrates a graphical methodology of identifying data points 67, which did not respect the equilibrium between capillary pressure and buoyancy. Note, a nonexhaustive list of possible reasons/explanations for the deviation can include, production impact/flushed interval, paleo/residual oil saturation, incorrect or uncalibrated permeability interpretation, affect on resistivity based Sw and/or porosity logs by conductive and/or heavy minerals, wrong Archie™ saturation parameters, laminated beds, resolution discrepancies between different logging tools, inaccurate or uncalibrated Vshale, and/or bad hole data.

The reasons for the discrepancies can be identified, for example, by cross validation with other field data and background such as production, petrophysics, lithography, etc. (item 125). If discrepancies exist, the data should be corrected to respect the linear trend of capillary pressure/buoyancy equilibrium or excluded from the cross plot to avoid bias in the wettability, FWL, and pore architecture characterization (item 127).

Note, tight carbonates usually have a higher degree of homogeneity due to their original low-energy depositional environment—which translates to having a very small G parameter. Also, because of the small size of the pore throat and pore bodies, wettability is generally not altered as much as in big pores having less contact surface, and therefore, show more water wet properties. Additionally, in 1 mD rocks and lower, the permeability computed from the Thomeer model is nearly 10 times lower than the measured air permeability. Discrepancies can also be due to the selection of the G+ solution rather than the G− solution, and vice versa, where the opposite solution would be appropriate. Extended well production can also result in a weaker X/Y correlation because saturation values will tend toward $S_{or}$, and therefore, become independent of $H_{fwl}$.

Further discrepancies in the form of Sw mismatches can be a result of lamination. Such mismatch can originate from the Deep Induction resistivity tool (ILD) which does not read the true resistivity when the bedding is structured as a lamination between shales and sands. Since the Sw is therefore incorrect, the link between permeability, porosity and the apparent amount of oil read by the logging tools is broken. These mismatched intervals form locations where the G parameter cannot accommodate for the tool response within a physical meaningful range. Integration with the core description shows that lithology and sedimentation pattern (not shown) can explain why the balance between buoyancy and capillary pressure is not respected.

Referring again to FIG. 13, the step of calculating mercury pore architecture at log resolution level (item 109') is performed using the values of the calculated well constants ($\tilde{S}$, g or G, C or W) and input log data applied, for example, to one or more of the following equations:

$$\text{Pore Throat Heterogeneity}_{(unitless)} = G = \frac{x_\pm}{\ln 10}$$

Where $$x_\pm = -\frac{\beta}{4}\ln\tilde{S}\left[1 \pm \sqrt{1 + \frac{16}{\beta^2 \ln \tilde{S}}\left(W - \ln\left(h\sqrt{\frac{k}{\phi}}\right)\right)}\right]$$

$$\text{Pore Volume}_{(dec)} = B_v = 1.1 * \phi$$

$$\text{Pore throat diameter}_{(\mu m)} = \frac{214}{P_d} = \frac{214}{\sqrt{506000 + \frac{B_v}{K} * e^{-4.43*\sqrt{G}}}}.$$

The quality control and validation analysis of the physical consistency of the results of the pore architecture calculations can be performed (item 111'). If found to be physically consistent (or when modified to provide physical consistency), the water saturation (SWth) can be recalculated using the pore architecture parameters, for example, applied to the following algorithm:

$$S_w = 1 - \frac{B_v}{\varphi} * e^{\frac{-G}{\log_{10}\left(\frac{P_c}{P_d}\right)}} \text{ if } P_c > P_d \text{ else } S_w = 1.$$

According to an exemplary configuration, a P50 comparison between the calculated pore architecture at log resolution and core data determined through Mercury Injection Capillary Pressure core data measurement can be used to determine the number of samples falling within a standard deviation range of the measured G. Note, upscaling may be required to smooth out core-plug scale variability because where a plug measurement is generally one-inch, corresponding log data measurement or taken over 2 to 3 feet minimum. Other factors can include water saturation mismatches as a result of the amount of micro porosity, proper value for saturation exponent and cementation factor, use of a variable m, under or bias core sampling, etc., and core depth mismatch which may increase a lack of correlation between predicted and expected values.

Figure 16:
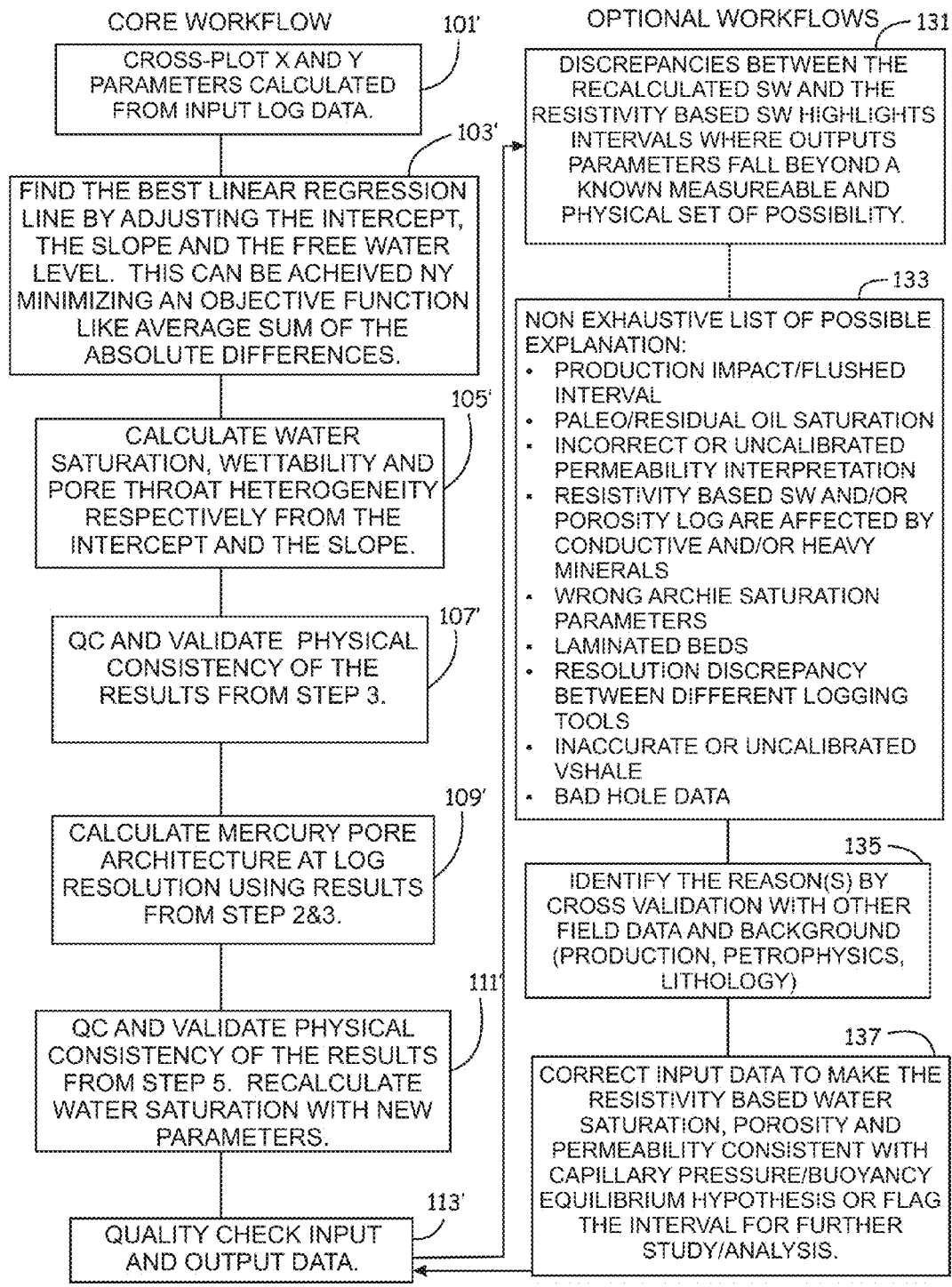
FIG. 16 is a schematic flow diagram illustrating a global quality control implementation methodology according to an embodiment of the present invention.

FIG. 16 illustrates steps for performing a global quality check of input and output data (item 113') according to an embodiment of the present invention. According to an exemplary configuration, discrepancies between the recalculated water saturation (SWth) and resistivity based water saturation (SWT) can highlight intervals where output parameters fall beyond a known measurable and physical set of possibilities (item 131). These discrepancies can be located/identified, for example, via least-squares comparison or by visual inspection of, e.g., values/plot of SWT (baseline data), SWth, and SWJ (provided using the Leverett-J function).

A non-exhaustive list of possible explanations should be reviewed (item 133), and reasons for the discrepancies should be identified (item 135). The reasons for the discrepancies can be identified, for example, by cross validation with other field data and background such as production, petrophysics, lithography, etc. If discrepancies exist, the data should be corrected to make the resistivity-based water saturation, porosity, and permeability consistent with capillary pressure/buoyancy equilibrium hypothesis, or flag the interval for further study/analysis (item 137).

Figure 17:
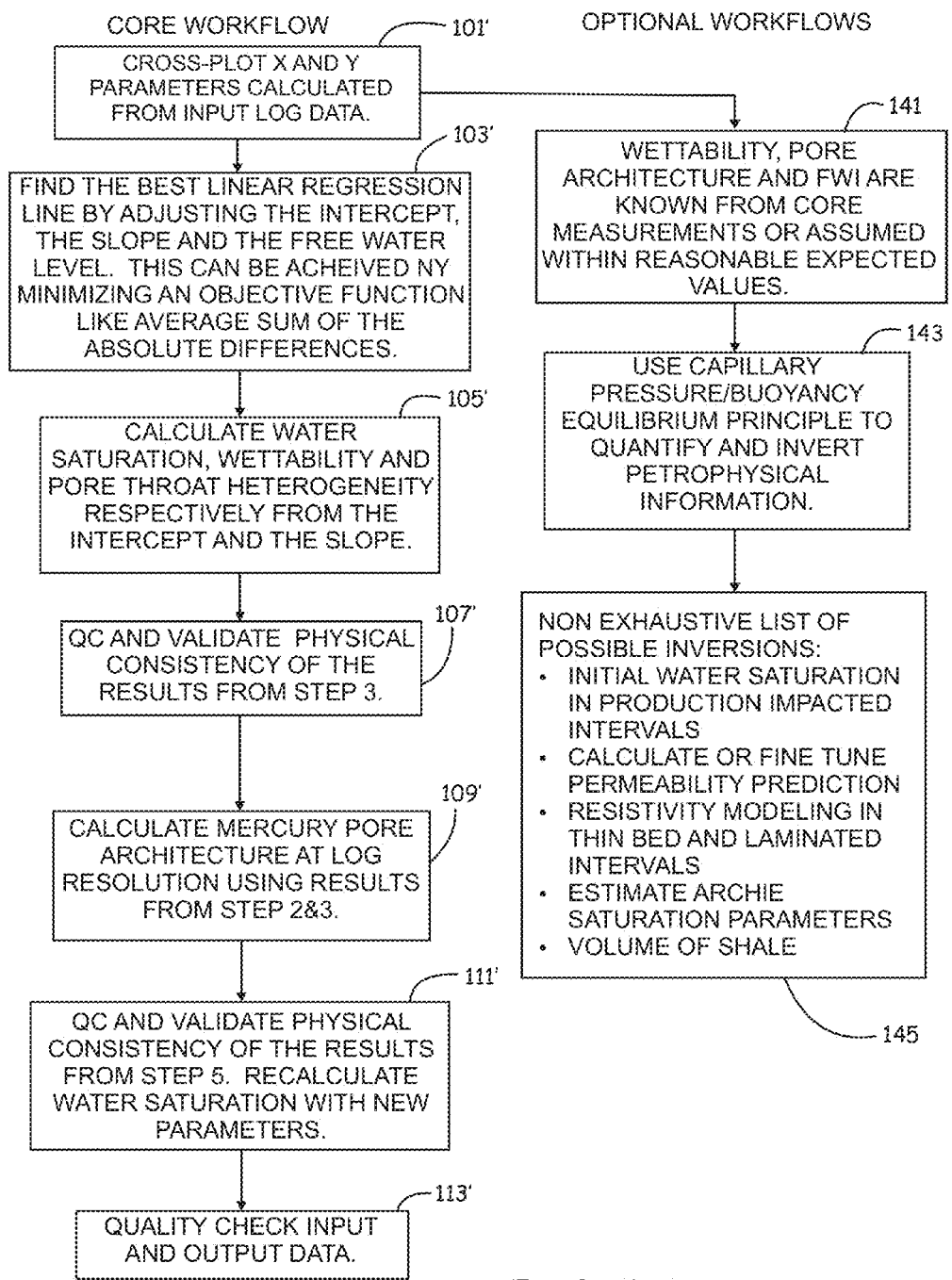
FIG. 17 is a schematic flow diagram illustrating a methodology for determining a plurality of inversions of well constants and pore architecture parameters according to an embodiment of the present invention.

FIG. 17 illustrates a methodology for determining a plurality of inversions of well constants and pore architecture parameters according to an exemplary configuration. The methodology can include determining or assuming values within a reasonable expected range of values for wettability, pore architecture, and free water line from core measurements (block 141), and quantifying and inverting petrophysical information using capillary pressure-buoyancy equilibrium principal (block 143). A nonexhaustive list of possible inversions includes updating the initial water saturation in production impacted intervals, calculating or fine tuning the permeability prediction-resistivity modeling in thin bed and laminated intervals, estimating Archie saturation parameters, and determining the volume of shale (block 145).

E. Computer Readable Media

It is important to note that while the foregoing embodiments of the present invention have been described in the context of method steps which can be performed using or assisted by a fully functional computer apparatus, those skilled in the art will appreciate that the mechanism of at least portions of the present invention and/or aspects thereof are capable of being distributed in the form of a computer readable medium in a variety of forms capable of storing a set of instructions for execution on a processor, processors, or the like, and that various embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions related to program code/product for determining water saturation, wettability, and pore architecture for a well and the computer executable portions of the method steps according to the various embodiments of a method of determining water saturation, wettability, free water level, Thomeer parameters, and pore architecture for a hydrocarbon well utilizing data available from conventional/standard electronic well logs, described above. The computer readable medium comprises non-transitory computer readable medium or media which is understood to mean includes all forms of computer readable storage media that do not fall under the category of being non-statutory subject matter, in general, or take the form of a propagating signal per se, in particular. The computer, for example, can be in the form of a machine including a processor (single core or multi-core) or multiple processors capable of executing instructions to perform the featured steps/operations, and can be embodied as a personal computer, a server, or a server farm serving multiple user interfaces or other configurations known to those skilled in the art.

F. Additional Information

As a recap, various embodiments of the present invention provide several specific advantages. For example, various embodiments of the present invention provide industry-standard results with less input data, and provide parameters which themselves provides the user a better understanding and enhance reliability with no additional input data requirements. Fitting parameters can advantageously be related to measurable physical quantities. Every term in a developed water saturation height function can be related directly to a physical parameter. Various embodiments of the present invention advantageously do not require the density of water ($\rho_w$), the density of oil/hydrocarbons ($\rho_{hc}$), the water-hydrocarbon density difference ($\Delta\rho$), or wettability (IFT cos θ, σ cos θ, or ln(σ cos θ)) as input parameters. Various embodiments of the present invention employ a simple statistical determination of parameters, yet provide results that are as accurate as those provided by the Leverett J-function when fitting only one parameter Various embodiments of the present invention enable an inversion technique for wettability from standard log response (Neutron, Density, Deep Resistivity, GammaRay) in a significantly reduced amount of time at no extra cost. Additionally, various embodiments also enable continuous measurement of a pore geometry Thomeer parameter in a significantly reduced amount of time at no extra cost. Various embodiments of the present invention can also enable quality control of, e.g., electric or other conventional log data against physics principles, free water level inversion, and/or log interpretation quality checks. Still further, various embodiments of the present invention provide a direct application to the characterization of secondary carbonate reservoirs.

This application is a non-provisional of and claims priority to and the benefit of U.S. Provisional Application No. 61/550,209, filed on Oct. 21, 2011, and is related to U.S. patent application Ser. No. 13/657,408, filed on Oct. 22, 2012, titled "Apparatus and Computer Readable Medium for Determining Well Characteristics and Pore Architecture Utilizing Conventional Well Log," incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A computer implemented method of determining well characteristics and pore architecture for a well, the method comprising the steps of:

conducting an in-situ logging of a well to generate a well log comprising a permeability, a porosity, and a height of a free water line for the well derived from in-situ measurements of the logging of the well, the in-situ logging of the well not comprising extraction of an oil sample from the well and the well log not comprising data obtained via assessment of an oil sample extracted from the well;

generating, by a computer, a plurality of data points for the well, wherein each of the data points is defined by:
an X parameter indicative of water saturation; and
a Y parameter indicative of rock parameters including permeability and porosity, a density of a hydrocarbon associated with the well, and height of a free water line,
the X and Y parameters for each data point determined as follows $$X = \frac{-1}{\ln\left(\frac{1-S_w}{1.1}\right)} - \frac{2.92}{2}\sqrt{g}$$

$$Y = \ln(\rho_w - \rho_{hc}) - 0.5 * \ln\left(506000 * \frac{B_v}{\varphi}\right) + 5.07 + \ln\left(H_{fwl} + \sqrt{\frac{K}{1.1*\varphi}}\right),$$

wherein $S_w$ represents a water saturation,
g represents a poro-elastic constant,
$\rho_w$ represents a density of water, $\rho_{hc}$ represents a density of a hydrocarbon associated with the well, By represents a fractional bulk volume, $\phi$ represents the porosity, $H_{fwl}$ represents the height of a free water line, and K represents the permeability;

determining, by the computer and for the plurality of data points, a linear regression line having a slope and an intercept; and determining, by the computer, a value of each well constant of a plurality of well constants for the well based on the slope and the intercept of the linear regression line, the well constants comprising average pore throat heterogeneity and average wettability, the determining a value of each well constant of a plurality of well constants for the well comprising:

determining the average pore throat heterogeneity for the well based on the slope of the linear regression line; and determining the average wettability for the well based on the intercept of the linear regression line, such that the average pore throat heterogeneity and the average wettability for the well are determined based on the in-situ measurements of the in-situ logging of the well and are not determined based on an assessment of an oil sample extracted from the well.

2. The method of claim 1, wherein the step of determining a linear regression line comprises:

determining a best match linear regression line by adjusting the intercept and the slope of the linear regression line and the free water level location, the step of determining the best match linear regression line comprising the step of minimizing an objective function to thereby identify the intercept, the slope, and the free water level location that provides the best match linear regression line.

3. The method of claim 2, wherein the step of determining a value of each well constant of a plurality of well constants for the well comprises:

determining a free water level location corresponding to the linear regression line such that the free water level location is determined based on the in-situ measurements of the in-situ logging of the well.

4. The method of claim 3, wherein the step of determining a value of each of the plurality of well constants comprises:

determining an at least substantially most likely combination of values of the free water level location, the average pore throat heterogeneity, and the average wettability; and calculating water saturation based on a slope and an intercept corresponding to the average pore throat heterogeneity and the average wettability of the at least substantially most likely combination.

5. The method of defined in claim 4, wherein the parameters calculated from the well log data define a plurality of data points;

wherein the step of determining a linear regression line comprises determining a best match linear regression line, the step of determining the best match linear regression line comprising the step of minimizing an objective function, the step of minimizing an objective function comprising the steps of minimizing an average sum of absolute differences between a location of each data point of the plurality of data points and each candidate best match linear regression line of a plurality of candidate best match linear regression lines; and wherein the step of determining an at least substantially most likely combination of values of the free water level location, the average pore throat heterogeneity, and the average wettability comprises identifying a slope and an intercept of the best match linear regression line.

6. The method of claim 4, wherein the step of determining an at least substantially most likely combination of values of the free water level location, the average pore throat heterogeneity, and the average wettability comprises:

employing a Monte Carlo simulation and an objective function to determine the most likely combination of the free water line location, the pore throat heterogeneity, and the wettability.

7. The method of claim 1, wherein the step of determining a linear regression line comprises:

determining a best match linear regression line by adjusting the intercept and the slope of the linear regression line, the step of determining the best match linear regression line comprising the step of minimizing an objective function to thereby identify the intercept and the slope that provides the best match linear regression line.

8. The method of claim 1, wherein the parameters calculated from the well log data define a plurality of data points, the method further comprising the step of validating a physical consistency of water saturation, the wettability, and the pore throat heterogeneity, the validating step comprising the steps of:

identifying one or more data points of the plurality of data points which do not fall within a linear trend, when so existing; and when there exists one or more data points of the plurality of data points that do not fall within the linear trend, identifying one or more reasons respectively, and repairing the plurality of data points, the step of repairing comprising performing one or more of the following steps:

correcting data associated with one or more data points which does not fall within the linear trend, and excluding one or more data points from the plurality of data points, to thereby avoid bias in the wettability, pore throat heterogeneity, and free water line characterization.

9. The method of claim 1, further comprising the steps of:

validating a physical consistency of water saturation, the average wettability, and the average pore throat heterogeneity well constants; and calculating pore architecture parameters at log resolution based on the validated well constants, the pore architecture parameters including pore throat heterogeneity, pore volume, and pore throat diameter.

10. The method of claim 1, further comprising the steps of:

calculating water saturation based on the slope and the intercept of the linear regression line;

validating a physical consistency of pore architecture parameters; and recalculating the water saturation utilizing the pore architecture parameters.

11. The method of claim 1, wherein the parameters calculated from the well log data define a plurality of data points of a cross plot, and wherein the step of determining a linear regression line comprises:

determining a best match linear regression line by adjusting the intercept and the slope of the linear regression line, the step of determining the best match linear regression line comprising the step of minimizing an objective function to thereby identify the intercept and the slope that provides the best match linear regression line, the objective function determined as an average of orthogonal distances (D) between each of the plurality of data points of the cross plot and a regression line having a slope and an intercept, the average distance written as follows for n data points:

$$\overline{D} = \frac{1}{n} * \sum_{i=1}^{i=n} D_i = \frac{1}{n} * \sum_{i=1}^{i=n} \frac{|\text{Slope} * x_i - y_i + \text{Intercept}|}{\sqrt{\text{Slope}^2 + 1}}.$$

wherein n represents a total number of data points in the plurality of data points, and
wherein $x_i$ and $y_i$ represent coordinates for a respective data point (i) of the plurality of data points.

12. The method of claim 1, further comprising the step of determining a value of each well constant of a plurality of well constants comprises calculating the wettability, the pore throat heterogeneity, and water saturation from the intercept and the slope of the linear regression line according to the following equations:

$$\text{Wettability}_{dyn/cm} = \sigma * \cos\theta = e^{\text{Intercept}}$$

$$\text{Pore Throat Heterogeneity}_{(unitless)} = G = \frac{\text{Slope}}{\ln 10}$$

$$S_w = 1 - 1.1 * e^{\frac{\text{Slope}}{\text{Intercept} - Y - \frac{2.92}{2} * \text{Slope}^{\frac{3}{2}}}}.$$

wherein slope represents a slope of the linear regression line,
wherein Intercept represents an intercept of the linear regression line;
wherein $\sigma$ represents interfacial tension, and
wherein $\theta$ represents contact angle.

13. The method of claim 1, further comprising the step of:
calculating pore architecture parameters at log resolution, the pore architecture parameters including pore throat heterogeneity, pore volume, and pore throat diameter, calculated according to the following equations:

$$\text{Pore Throat Heterogeneity}_{(unitless)} = G = \frac{x_\pm}{\ln 10}$$

Where $$x_\pm = -\frac{\beta}{4} \ln \overline{S} \left[ 1 \pm \sqrt{1 + \frac{16}{\beta^2 \ln \overline{S}} \left( W - \ln\left( h \sqrt{\frac{k}{\phi}} \right) \right)} \right].$$

$$\text{Pore Volume}_{(dec)} = B_v = 1.1 * \phi$$

$$\text{Pore throat diameter}_{(\mu m)} = \frac{214}{P_d} = \frac{214}{\sqrt{506000 + \frac{B_v}{K} * e^{-4.43 * \sqrt{G}}}}.$$

wherein $\beta$ is about 2.92,
wherein Bv represents fractional bulk volume,
wherein $P_d$ represents minimum entry pressure,
wherein $$\tilde{S} = \frac{\phi}{Bv} * So,$$

and
wherein
$$So = 1 - Sw.$$

14. The method of claim 1, further comprising the steps of:
validating a physical consistency of the pore architecture parameters; and
recalculating water saturation utilizing the pore architecture parameters responsive thereto according to the following equation:

$$S_w = 1 - \frac{B_v}{\varphi} * e^{\frac{-G}{\log_{10}\left(\frac{P_c}{P_d}\right)}} \text{ if } P_c > P_d \text{ else } S_w = 1.$$

wherein Bv represents fractional bulk volume,
wherein $P_d$ represents minimum entry pressure
wherein:

$$P_c = 0.433 * (\rho_w - \rho_{hc}) * \frac{367}{\text{Wettability}},$$

and
wherein Wettability is defined as follows:
$$\text{Wettability}_{dyn/cm} = \sigma * \cos\theta = e_{\text{Intercept}},$$

wherein Intercept is the intercept of the linear regression line;
wherein $\sigma$ represents interfacial tension,
wherein G represents pore throat heterogeneity, and
wherein $\theta$ represents contact angle.

15. A computer-implemented method of determining well characteristics and pore architecture for a well, the method comprising the steps of:
determining a permeability, a porosity, and a height of a free water line for a well based on in-situ measurements of well log data for the well generated via in-situ logging of the well, the in-situ logging of the well not comprising extraction of an oil sample from the well and the well log data not comprising data obtained via assessment of an oil sample extracted from the well;
determining a plurality of data points for the well, wherein each of the data points of the plurality of data points is defined by:
an X parameter indicative of water saturation; and
a Y parameter indicative of rock parameters including permeability and porosity, a density of a hydrocarbon associated with the well, and height of a free water line,
the X and Y parameters for each data point determined as follows:

$$X = \frac{-1}{\ln\left(\frac{1 - S_w}{1.1}\right)} - \frac{2.92}{2} \sqrt{g}$$

-continued $$Y = \ln(\rho_w - \rho_{hc}) - 0.5 * \ln\left(506000 * \frac{B_v}{\varphi}\right) + 5.07 + \ln\left(H_{fwl} * \sqrt{\frac{K}{1.1 * \varphi}}\right),$$

wherein $S_w$ represents a water saturation,
g represents a poro-elastic constant,
$\rho_w$ represents a density of water,
$\rho_{hc}$ represents a density of a hydrocarbon associated with the well,
Bv represents a fractional bulk volume,
$\varphi$ represents the porosity,
$H_{fwl}$ represents the height of a free water line, and
K represents the permeability;
determining, for the plurality of data points, a linear regression line having a slope and an intercept; and
and
determining, by a computer, a value of each well constant of a plurality of well constants based on the slope and the intercept of the linear regression line, the plurality of well constants including average wettability and average pore throat heterogeneity, the determining a value of each well constant of a plurality of well constants for the well comprising:
determining the average pore throat heterogeneity for the well based on the slope of the linear regression line; and
determining the average wettability for the well based on the intercept of the linear regression line,
such that the average pore throat heterogeneity and the average wettability for the well are determined based on the in-situ measurements of the well log data for the well generated via the in-situ logging of the well and are not determined based on an assessment of an oil sample extracted from the well.

16. The method of claim 15, wherein determining a linear regression line comprises determining a best match linear regression line.

17. The method of claim 16, wherein the step of determining the best match linear regression line comprises the step of:
minimizing an objective function, the step of minimizing an objective function comprising the steps of minimizing an average sum of absolute differences between a location of each data point of the plurality of data points and each candidate best match linear regression line of a plurality of candidate best match linear regression lines.

18. The method of claim 16, the method further comprising the step of validating a physical consistency of water saturation, the wettability, and the pore throat heterogeneity, the validating step comprising the steps of:
identifying one or more data points of the plurality of data points which do not fall within a linear trend, when so existing; and
when there exist one or more data points of the plurality of data points that do not fall within the linear trend, identifying one or more reasons respectively, and repairing the plurality of data points, the operation of repairing comprising performing one or more of the following operations:
correcting data associated with one or more data points which does not fall within the linear trend, and
excluding one or more data points from the plurality of data points to thereby avoid bias in the wettability, pore throat heterogeneity, and free water line characterization.

19. The method of claim 15, further comprising the steps of:
calculating water saturation based on the slope and the intercept of the linear regression line;
validating a physical consistency of pore architecture parameters; and
recalculating the water saturation utilizing the pore architecture parameters.

20. The method of claim 15, wherein the step of determining a value of each well constant of a plurality of well constants comprises:
determining a free water level location corresponding to the linear regression line such that the free water level location is determined based on the in-situ measurements of the well log data for the well obtained via the in-situ logging of the well;
determining an at least substantially most likely combination of values of the free water level location, the average pore throat heterogeneity, and the average wettability; and
calculating water saturation based on a slope and an intercept corresponding to the pore throat heterogeneity and the wettability of the at least substantially most likely combination of values.

21. The method of claim 15, further comprising the steps of:
validating a physical consistency of water saturation, the wettability, and the pore throat heterogeneity well constants; and
calculating pore architecture parameters at log resolution based on the validated well constants, the pore architecture parameters including pore throat heterogeneity, pore volume, and pore throat diameter.

22. A method comprising the steps of:
determining, by a computer, a permeability, a porosity, and a height of a free water line for a well based on in-situ measurements of well log data for the well generated via in-situ logging of the well, the in-situ logging of the well not comprising extraction of an oil sample from the well and the well log data not comprising data obtained via assessment of an oil sample extracted from the well;
determining, by the computer, a plurality of data points from well log data extracted from an electronic well log wherein each of the data points of is defined by:
an X parameter indicative of water saturation; and
a Y parameter indicative of rock parameters including permeability and porosity, a density of a hydrocarbon associated with the well, and height of a free water line,
the X and Y parameters for each data point determined as follows:

$$X = \frac{-1}{\ln\left(\frac{1-S_w}{1.1}\right)} - \frac{2.92}{2}\sqrt{g}$$

$$Y = \ln(\rho_w - \rho_{hc}) - 0.5 * \ln\left(506000 * \frac{B_v}{\varphi}\right) + 5.07 + \ln\left(H_{fwl} * \sqrt{\frac{K}{1.1 * \varphi}}\right),$$

wherein $S_w$ represents water saturation,
g represents a poro-elastic constant,
$\rho_w$ represents a density of water, $\rho_{hc}$ represents a density of a hydrocarbon associated with the well, Bv represents a fractional bulk volume, $\phi$ represents the porosity, $H_{fwl}$ represents the height of the free water line, and K represents the permeability;

determining, by the computer and for the plurality of data points, a linear regression line having a slope and an intercept, determining, by the computer, a pore throat heterogeneity for the well based on the slope of the linear regression line; and determining, by the computer, a wettability for the well based on the intercept of the linear regression line, such that the pore throat heterogeneity and the wettability for the well are determined based on the in-situ measurements of the in-situ logging of the well and are not determined based on an assessment of an oil sample extracted from the well.

23. The method of claim 22, wherein the step of determining a linear regression line comprises determining a substantially best match linear regression line having a slope and an intercept, and wherein the step of determining a value of each well constant of a plurality of well constants for the well comprises analyzing a combination of the intercept and the slope of the linear regression line.

24. The method of claim 22, wherein the pore throat heterogeneity is an average pore throat heterogeneity, and wherein the wettability is an average wettability.

* * * * *